INVENTORS.
HOWARD C. DAVIS
HAROLD E. TRUMBULL

April 30, 1968     H. C. DAVIS ET AL     3,380,379
SHEET GUIDING MECHANISM FOR A REPRODUCTION MACHINE
Filed Sept. 30, 1965     15 Sheets-Sheet 7

INVENTORS.
HOWARD C. DAVIS
HAROLD E. TRUMBULL
BY
ATTORNEYS

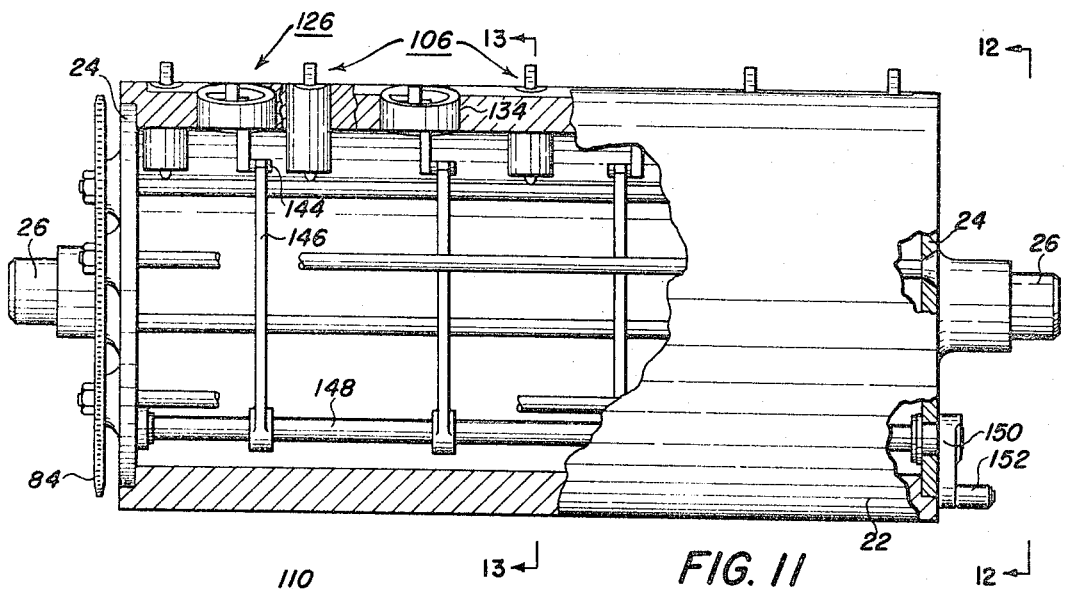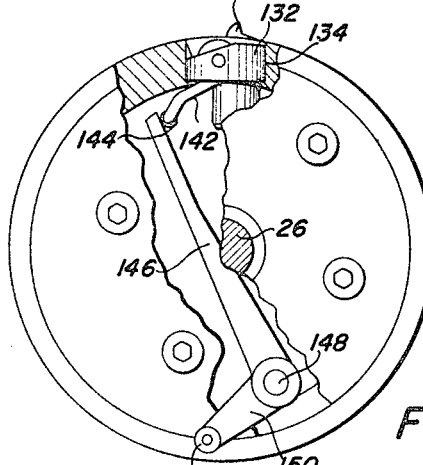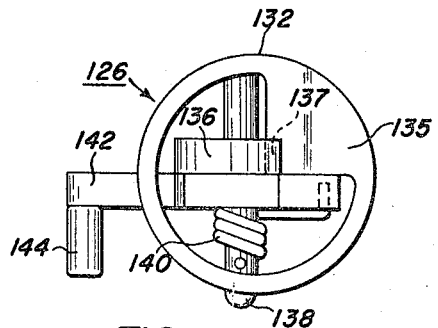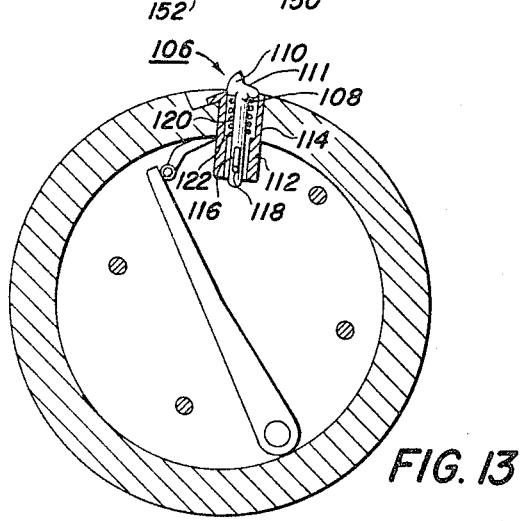

INVENTORS.
HOWARD C. DAVIS
HAROLD E. TRUMBULL
BY
ATTORNEYS

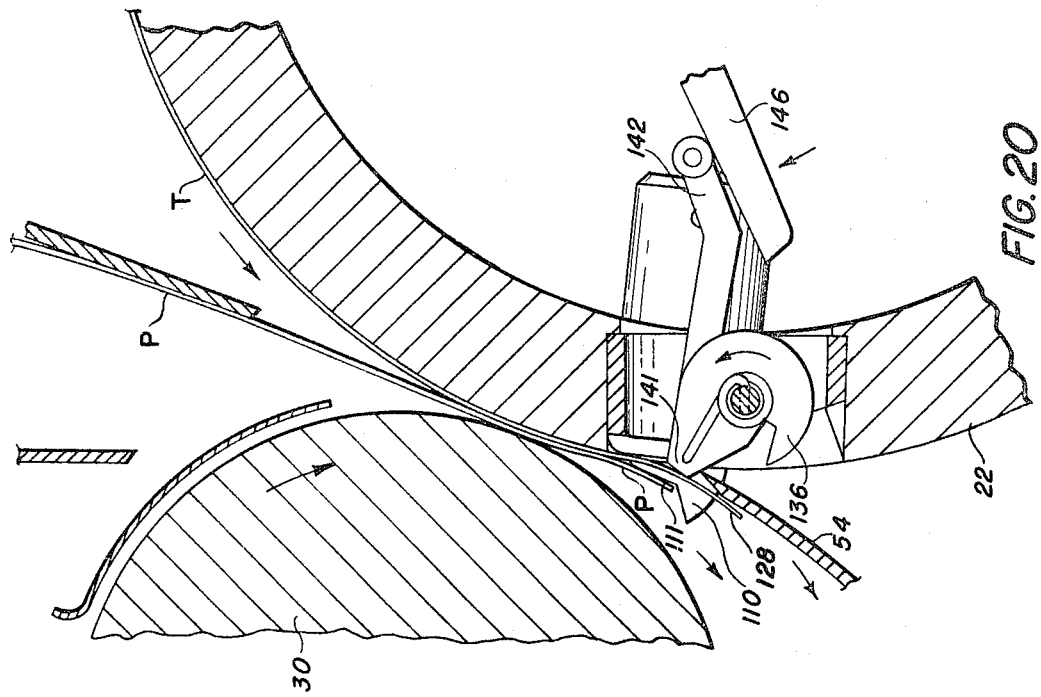
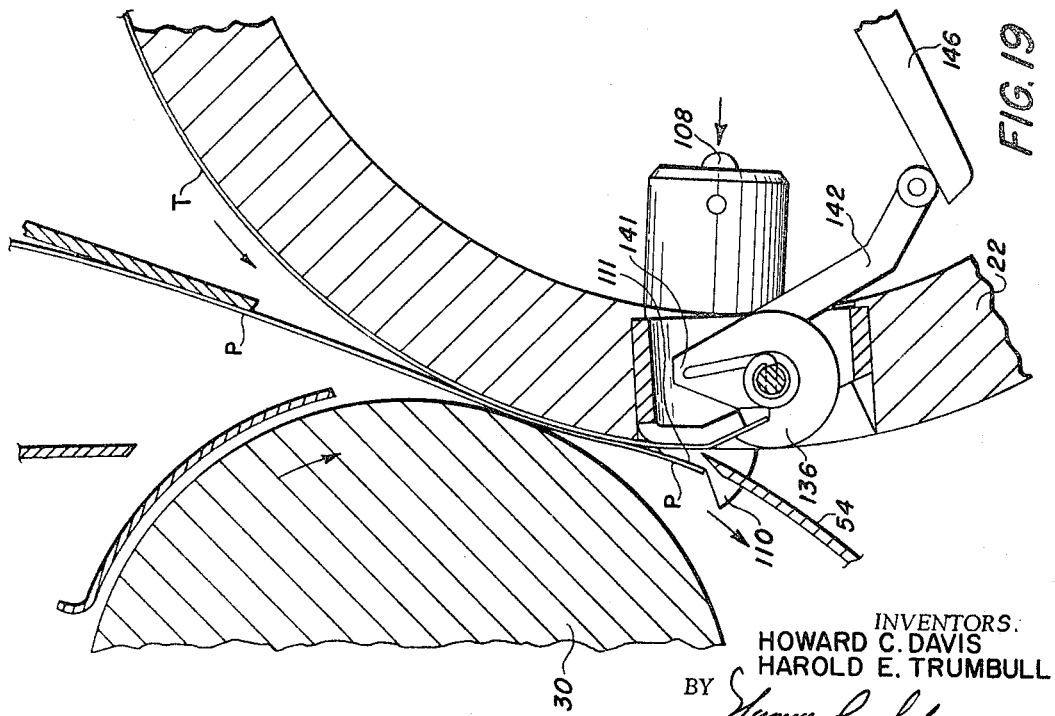
INVENTORS.
HOWARD C. DAVIS
HAROLD E. TRUMBULL

INVENTORS.
HOWARD C. DAVIS
HAROLD E. TRUMBULL
ATTORNEYS

INVENTORS.
HOWARD C. DAVIS
HAROLD E. TRUMBULL

United States Patent Office 3,380,379
Patented Apr. 30, 1968

3,380,379
SHEET GUIDING MECHANISM FOR A
REPRODUCTION MACHINE
Howard C. Davis and Harold E. Trumbull, Columbus, Ohio, assignors, by mesne assignments, to Xerox Corporation, Rochester, N.Y., a corporation of New York
Filed Sept. 30, 1965, Ser. No. 491,562
3 Claims. (Cl. 101—132)

ABSTRACT OF THE DISCLOSURE

A pressure transfer reproduction machine for transferring ink from one sheet to another having a pressure roller and a sheet guide movable to and retractable from the nip of the drum and the roller to direct a transfer sheet thereto.

---

The present invention relates to reproduction machines and more particularly to a sheet guiding mechanism or device for guiding a transfer sheet into a reproduction machine such as the pressure-transfer type.

Generally, reproduction machines of the pressure transfer configuration which are particularly suited as an environment for the present invention are two broad types. One type, known as a spirit duplicator, requires a copying fluid or spirit which moistens each copy sheet as it passes between a rotatable platen which supports a master or transfer sheet and a pressure roller. The spirit dissolves some of the dye on the master sheet, and the resultant dissolved dyestuff is transferred to the copy sheet as it is transported between the rollers.

Another type of pressure transfer duplicating equipment combines the effect of heat and pressure to effect transfer from a transfer sheet to a copy sheet. This type of equipment may take vrious forms and material such as the use of fixing compositions for the dyes imprinted upon a master sheet wherein heat is utilized to cause or enhance reaction between the dye and the fixing composition. Special circuits and temperature control devices are provided in these duplicating machines for insuring optimum transfer conditions.

Significantly, the present invention takes on added importance in that it may be devised in a reproduction machine having compact size, requiring a minimum of operative steps involving a completely dry process and which may be quickly brought into operation by the mere push of a button. With these advantages the machine, incorporating the invention, is particularly useful as a companion machine to the conventional typewriter, to be made a part of or an adjacent neighbor thereto and serve to eliminate the need to make carbon copies by use of the typewriter. In fact, the machine, incorporating the present invention, derives its most useful benefit in that reproduction of a typed original document may be accomplished solely by the machine, thus eliminating the cumbersome application of carbon paper to the typewriter and the burdensome manipulation of the carbon sheets in order to effect erasures of the carbon sheets and correction to the original.

It is a principal object of the present invention to improve office reproducing machines for general copying use by incorporating a sheet guiding mechanism for aiding in the insertion of a transfer sheet thereto and allowing proper placement of said sheet relative to the drum for gripping thereto.

Another object of the invention is to allow positioning of the sheet guide mechanism adjacent the nip of the drum and pressure roller and to allow retraction of the same as the gripping mechanism closes thereby clamping the transfer sheet to the drum.

Still another object of the invention is to construct a simple, easy to operate, retractable sheet guiding mechanism for use in an office reproducing machine that is operable to prevent inadvertent actuation of the drive mechanism prior to retraction of the guiding mechanism.

In order to accomplish these and other objects of the invention, there is provided a sheet guiding device in a reproducing machine which operates under a dry process requiring merely the application of pressure in order to effect transfer of information on an original document to ordinary copy paper. Any other suitable reproduction machine may be utilized with the present invention. The reproduction machine that will be described in association with the present invention comprises a rotatable drum for supporting therearound a transfer sheet and moving therewith first an original document and then a sheet of copy paper. A roller is also provided and arranged to be in pressure contact with the drum in the means of a support producing mechanism for effecting ink transfer. Each revolution of the drum is adapted to complete one reproduction of the original document and a counter mechanism is set into motion in cooperation with a programmer device in order to register individual copies being produced. There are included in the machine the sheet guiding device as well as means for driving the drum, registering means for assisting and insuring accurate feeding and movement of the various sheets into and through the machine, and paper clamping devices, under control of the programmer device, for controlling the movement or release of the sheets.

Further objects and advantages will become apparent after reading the following description when taken in conjunction with the accompanying drawings wherein:

FIGURE 11 is a front view of the drum with parts broken away;

FIGURE 12 is a sectional view taken along line 12—12 in FIGURE 11 with parts broken away;

FIGURE 13 is a sectional view of the drum taken along line 13—13 in FIGURE 11 with parts broken away;

FIGURE 14 is a top view of the transfer sheet grippers;

FIGURE 15 is a side view of FIGURE 14;

Figure 25:
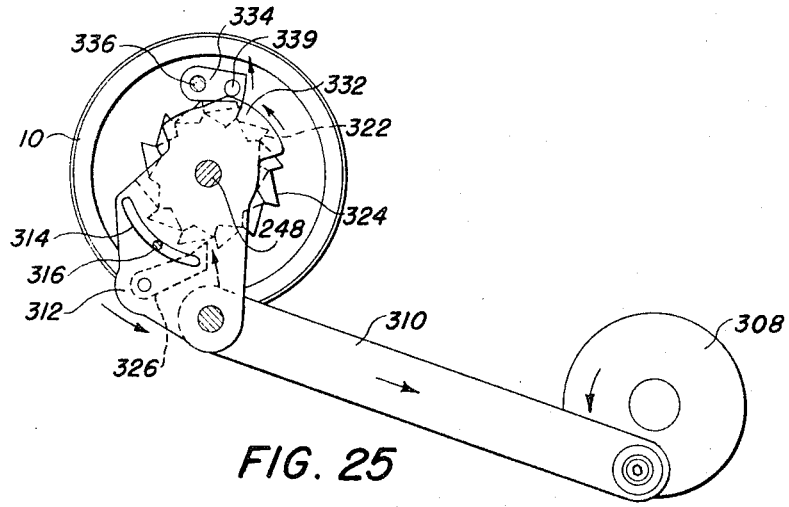
Figure 26:
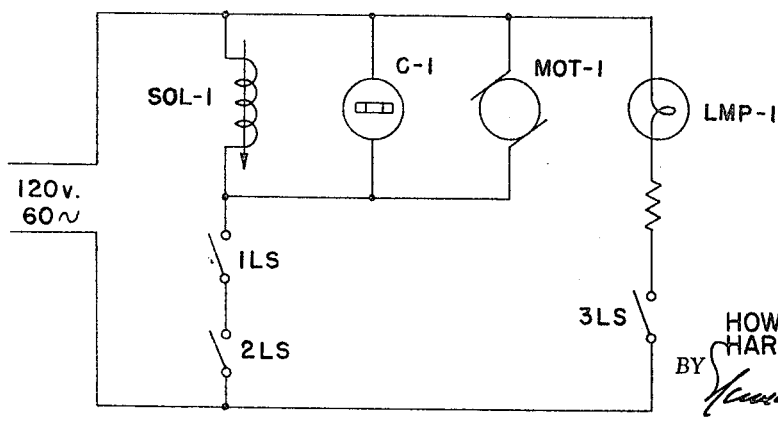

FIGURES 17, 18, 19, and 20 are enlarged fragmentary views of the invention's various positions of operation;

FIGURES 21, 22, 23, and 24 are schematic views of portions of the programmer mechanism shown in various positions of operation;

FIGURE 25 is a schematic view of a portion of the drive mechanism in one position of operation; and FIGURE 26 is a schematic electrical wiring diagram of the disclosed reproduction machine.

The reproducing machine to be described herein is particularly adapted for printing out copies on ordinary copy paper by means of a pressure transfer process involving a master or transfer sheet material produced as the first operative step in the use of the reproduction machine or of any particular run of the machine. The master or transfer sheet, in turn, derives or acquires the information to be reproduced from an original produced independently of the reproducing machine, such for example, by typing with a conventional typewriter.

In order to devise a transfer sheet that is usable with the present machine, the ink or pigment presented upon the transfer sheet must be transferable by the application of relatively high pressure. Production of the transfer sheet may be accomplished by two methods:

(a) The direct method wherein the transfer sheet is typed along with the original and a sheet of special carbon paper is positioned behind the transfer sheet with the carbon ink facing the master, and (b) The indirect method wherein the informational image is formed by typing with a special typing ribbon onto the original from which the image is transferred to a transfer sheet under pressure. The present reproduction machine is adapted to accommodate a transfer sheet produced by either method; however, it is preferred that the indirect method be employed since this method would not involve the added manipulative steps with a typewriter, that is, arranging an original, a carbon sheet and transfer sheet material in a typewriter and insuring adequate alignment of these sheets relative to one another. Essentially, the indirect method involves single-sheet typing.

In the indirect method, the master sheet is generally made of wax paper which may be wax coated base stock paper, whereas in the direct method, the transfer sheet need not be wax coated. The ink formulation for either the ribbon in the indirect method or the carbon paper in the direct may include a small percentage of wax; a large percentage of pigment, usually iron oxide or carbon pigment; and a modifier, such as petroleum and chlorinated rubber, which serves as a binder.

In producing a transfer sheet by the indirect method, the ink from the typewriter ribbon is transferred to the original sheet by striking of each typewriter key, as in the case with single-copy typing. The typed original is usable as such and may be mailed or routinely handled as an ordinary type ribbon copy. Reproductions of the original can be made by means of the present invention in view of the fact that a portion of the ink on the original will be transferred to the transfer sheet material by the application of pressure. To reproduce copies, the original sheet and a transfer sheet are aligned in the paper tray with the typed copy in contact with the coated surface of the transfer sheet and fed into the machine incorporating the present invention wherein high pressure is applied as the sheets are rolled through the pressure area in the machine. This action transfers the ink from the original to the transfer sheet. The transfer sheet is retained in the machine while the original is fed out. To make copies, a sheet of ordinary copy paper is placed in the feed tray where it is automatically registered with the copy on the transfer sheet and then rolled through the pressure area of the machine. With the application of pressure, some of the ink is transferred from the transfer sheet to the copy sheet. This step may be repeated in order to produce any number of copy sheets, for example, ten copies or more, depending upon the ink depth and the porosity of the papers utilized.

Figure 1:
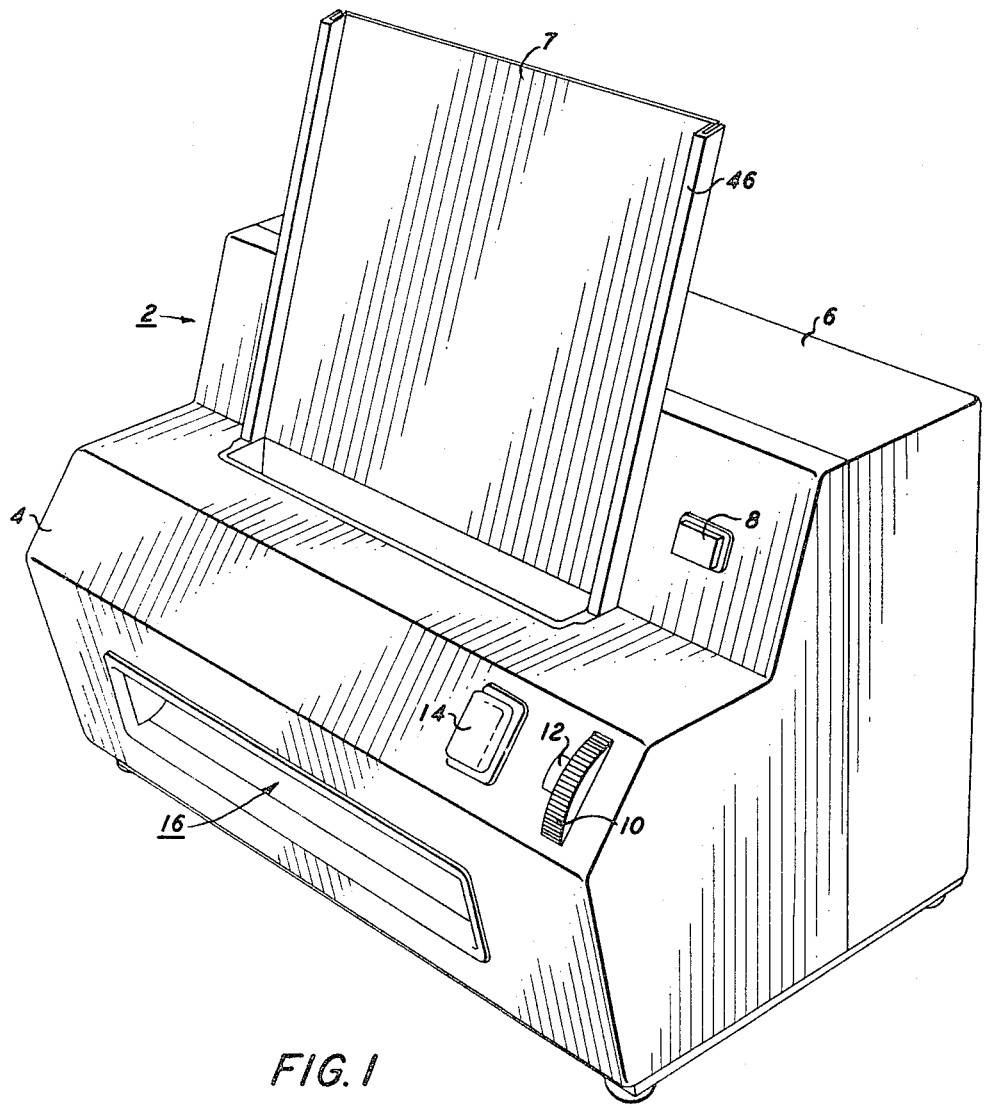
FIG. 1 is a right hand perspective view of the reproducing machine which embodies the present invention.

Throughout this description, the front of the reproducing machine, see FIG. 1, is regarded as that portion which the operator faces while placing sheet material on the machine for the reproduction. The right and left ends of the machine are regarded as being to the right and left of the operator as he faces the machine.

Referring to FIG. 1, the reproducing machine 2 embodying the present invention is shown. The reproducing machine 2 includes a front cover 4 and back cover 6. An input paper guide tray 7 is located in the top portion of the front cover 4 for inserting the transfer sheet and original or copy sheet. An indicator light 8 is mounted adjacent the input paper tray to indicate that the machine is ready for operation. A thumb wheel 10 and number indicator wheel 12 are mounted on the right hand side of the machine for dialing the number of copies desired. A push button 14 for commencing operation of the machine is located adjacent the number wheel. A paper exit guide 16 is located in the lower front portion of the machine.

Figure 2:
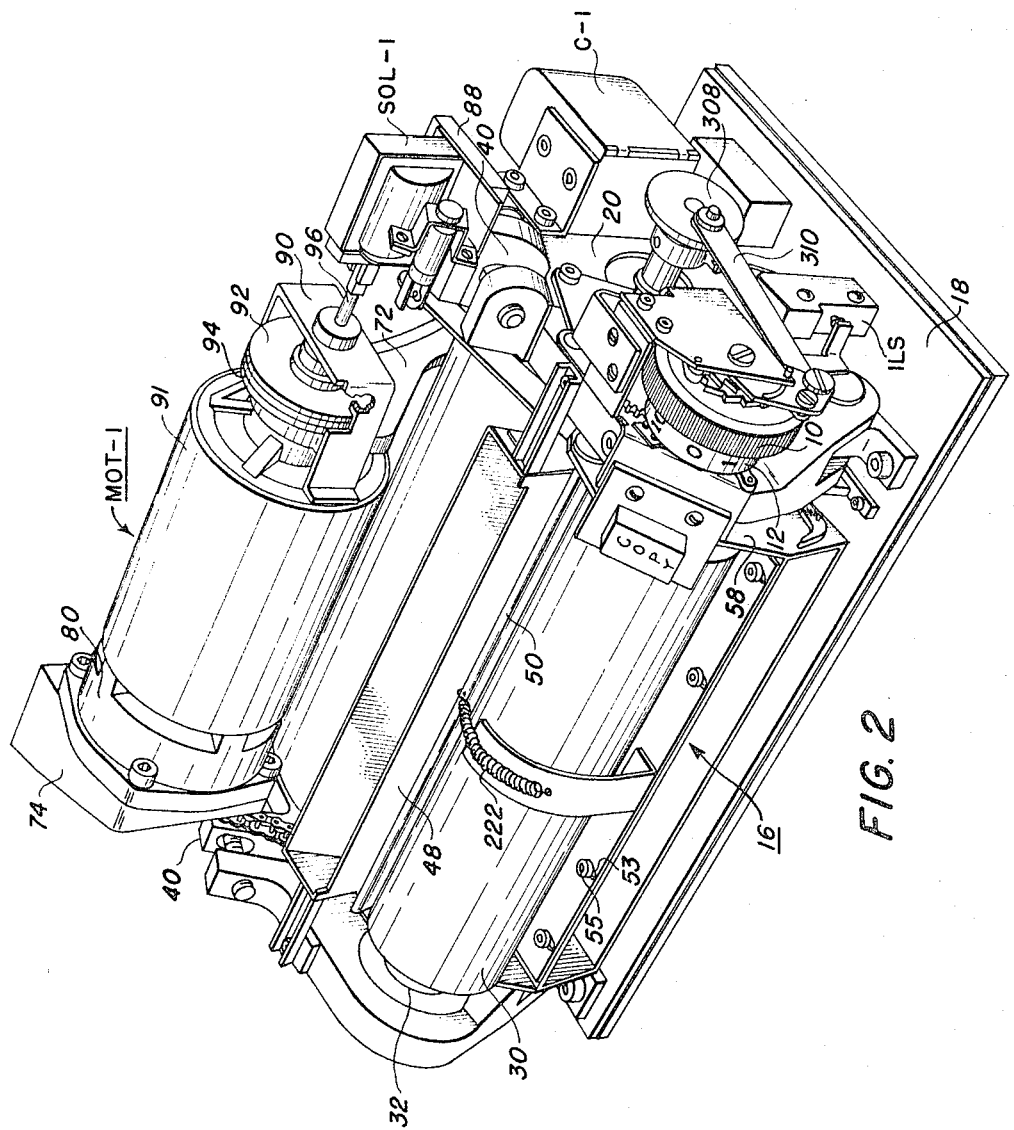
FIG. 2 is a right hand perspective view of the reproduction machine with the covers removed, and a counter added.

In FIG. 2 the reproducing machine is shown with the covers removed. The machine includes a base 18 having mounted thereon a pair of side brackets 20 one on each side of the machine. A drum 22 shown in FIG. 11 includes a pair of end plates 24 each having a stud shaft 26 secured thereto. The drum 22 is mounted for rotation by the shafts 26 in the side brackets 20. Pivotally attached to each of the side brackets 20 is a side roll supports 28, between which is mounted a pressure roller 30. The pressure roller 30 is preferably a solid piece of metal and has stub shafts 32 thereon for mounting in the side roll supports 28. Each of the side roll supports 28 is pivotally mounted on the side brackets 20 about a shaft 34 secured thereto. The side roll supports 28 and the side brackets 20 are connected by means of a bolt 38 which is screwed into the upper portion 36 of each side roll support 28. The bolts 38 are mounted through the upper portion 40 of the side brackets 20. A spring 42 is mounted between the head of each 38 and an upper portion 40 of the side brackets 20, thereby forcing the side roll supports 28 and therefore the pressure roller 30 into lineal pressure contact with the drum 22.

The springs 42 are of relatively high strength in order to produce extremely high pressure contact between the pressure roller and the drum, in order to produce linear pressure on the order of between 175 to 300 pounds per inch along the line of contact thereof.

The pressure roller 30 is mounted with the axis thereof substantially parallel to the axis of the drum, such that the roller 30 maintains peripheral contact with the drum 22. As will be presently described, the pressure roller is "crowned" or formed such that the peripheral diameter is larger at the center area, and tapering slightly toward the ends.

Figure 5:
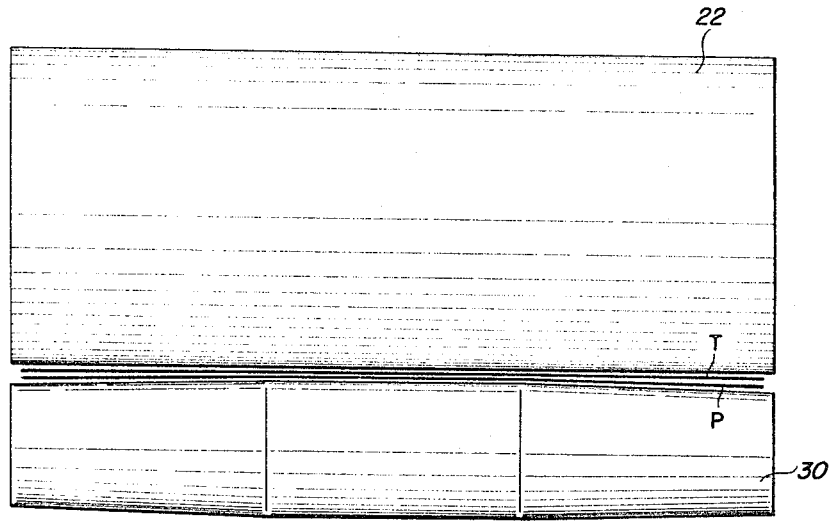
FIG. 5 is a schematic view of the drum and pressure roller in peripheral contact to emphasize the crowned configuration to the roller.

In FIG. 5, the crown configuration of the pressure roller 30 is shown schematically in relation to the drum. The tapered diameter from the center area, which is relatively flat toward the ends of the roller, as shown, are exaggerated in order to facilitate description. Good results have been attained from a configuration wherein each tapered end of the roller is approximately one-third of the length of the roller as is the center area, and the difference in diameter between the ends and the center area is on the order of one or two thousandths of an inch for a two and three-quarter inch diameter roller.

In operation of the machine during transfer there is a sheet of paper and a transfer sheet between the roller and the drum. An extremely high linear pressure or force exists along the linear contact of the roller and the drum with the paper and the transfer sheet therebetween as transmitted by the drum and pressure roller support shafts. Because the paper and transfer sheet are compressible and also because the supporting shafts are beyond the edge of the paper and the transfer sheet, the roller will be deflected; and if the pressure roller were of straight configuration, instead of crown, the pressure at the ends of the linear contact would be greater than at the center. The effect of this condition would be the production of copies that were darker at the edge portions of the copy sheet and lighter in the middle area. In addition, this uneven pressure axially along the drum produces a component of force which runs axially inwardly along the linear contact, and this component of force will result in the sheet being processed becoming wrinkled and creased out of shape.

With the provision of a "crowned" configuration to the pressure roller, the deflection of the roller caused by the extremely high pressure is balanced thereby resulting in parallel linear surfaces for the linear contact and even pressures throughout the contact. With the presence of an even pressure, the transferred image will be even in contrast or density. In addition, the balanced or even pressure will eliminate the axially directed component of force which would have produced wrinkling of the sheet.

The pressure roller 30 is driven by its frictional engagement with the drum 22. With this arrangement of the support members 20, 28, relatively high pressures on the order of 175 to 300 pounds per linear inch may be achieved at the line of contact between the drum surface and the surface of the pressure roller.

From the foregoing it will be apparent that the linear force or pressure between the drum 22 and the pressure roller 30 is accomplished by the particular arrangement of the drum 22, roller 30, and the springs 42.

Figure 4:
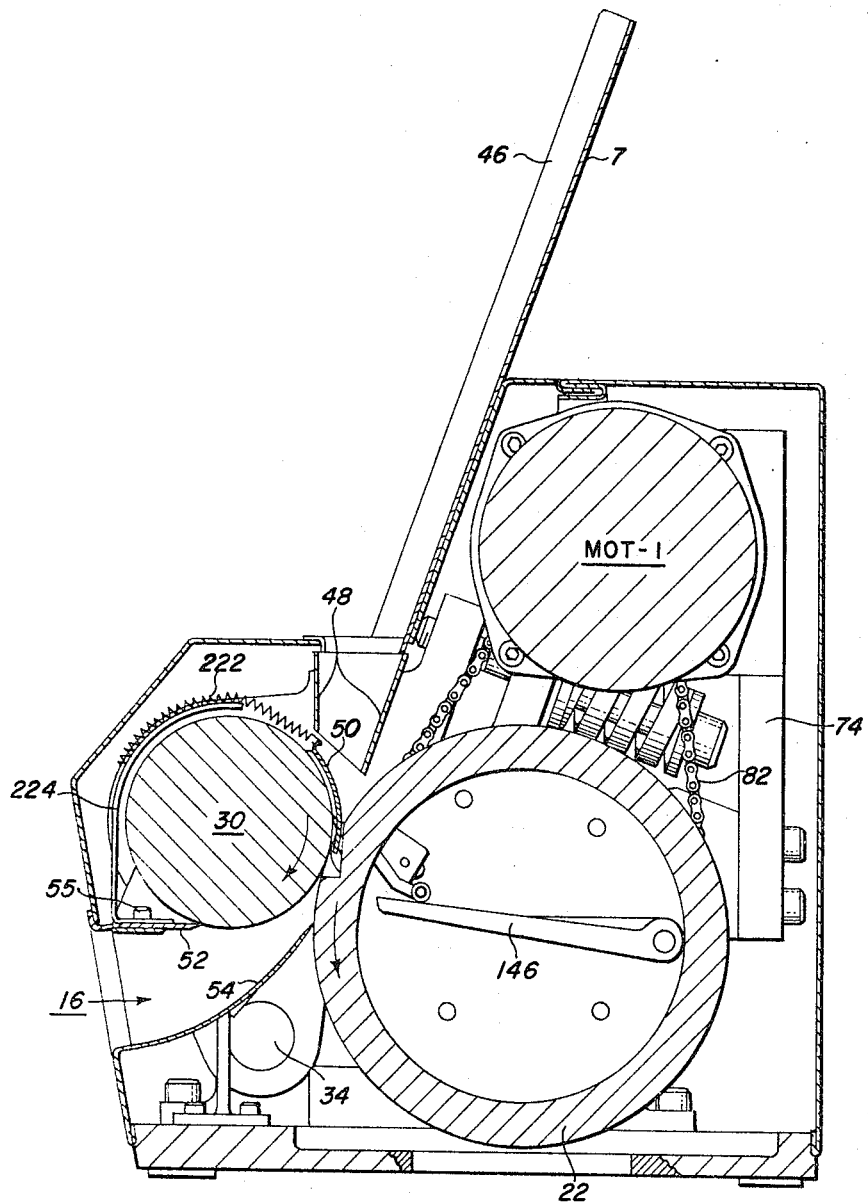
FIG. 4 is a sectional view of the machine taken along line 4—4 in FIG. 3.

Means are provided for guiding sheets of material such as transfer of copy sheets and originals into, through and out of the machine. Other means are also provided to establish a relationship between the sheets for effecting programmed handling as the various sheets are conveyed through the machine and include sheet registration devices and sheet clamping mechanisms. In guiding sheets of material into the machine, the paper tray 7 is arranged above the machine to direct a single sheet or double sheets to the vicinity of the nip of the drum pressure roller arrangement. The tray 7 is provided with flanges 46 at each edge thereof for assisting in the lateral positioning of the sheets as the same are fed to the nip. An insert paper guide device 48, shown in FIG. 4, is mounted on the upper portions 36 of the side roller supports 28 for directing and assisting in the positioning of the sheets of paper. A shutter 50, described below, is also provided for assisting in the positioning of the sheet.

In emerging from the machine, the sheet of material is guided by the paper exit guide mechanism generally indicated as 16. The paper exit guide 16 is pivotally mounted on the shafts 32, which, as previously stated, support the pressure roller 30 for rotation upon the machine. This paper exit guide mechanism includes an upper stripper 52 and a lower stripper 54. As shown in FIG. 4, the upper stripper 52 is slidably mounted in the paper exit guide 16 and adjustable relative thereto. The paper stripper 52 has slots 53 which ride along bolts 55 mounted on guide 16. The bolts 55 in slots 53 are provided to permit adjustment between the upper stripper 52 and the lower stripper 54 which is rigidly secured to the guide 16. The upper and lower strippers are formed with their longitudinal edges adjacent the pressure roller 30 and the drum 22 respectively. The strippers are preferably knife edged in their outer extremities. As a sheet or sheets of material are forced out by the rotation of the drum and the pressure roller the sheet or sheets are prevented from adhering to the roller 30 and are stripped off this roller by the stripper 52 and guided out the paper exit guide. The lower stripper 54 is provided with slot 57 (see FIG. 16) to allow the transfer grippers and registration devices described below to pass therethrough without interferring with the stripper 54. The lower stripper 54 serves to strip the original and each copy sheet from the transfer sheet in a manner to be described below. The lower stripper 54 also strips both the transfer sheet and the last copy produced in the machine as described below.

Figure 9:
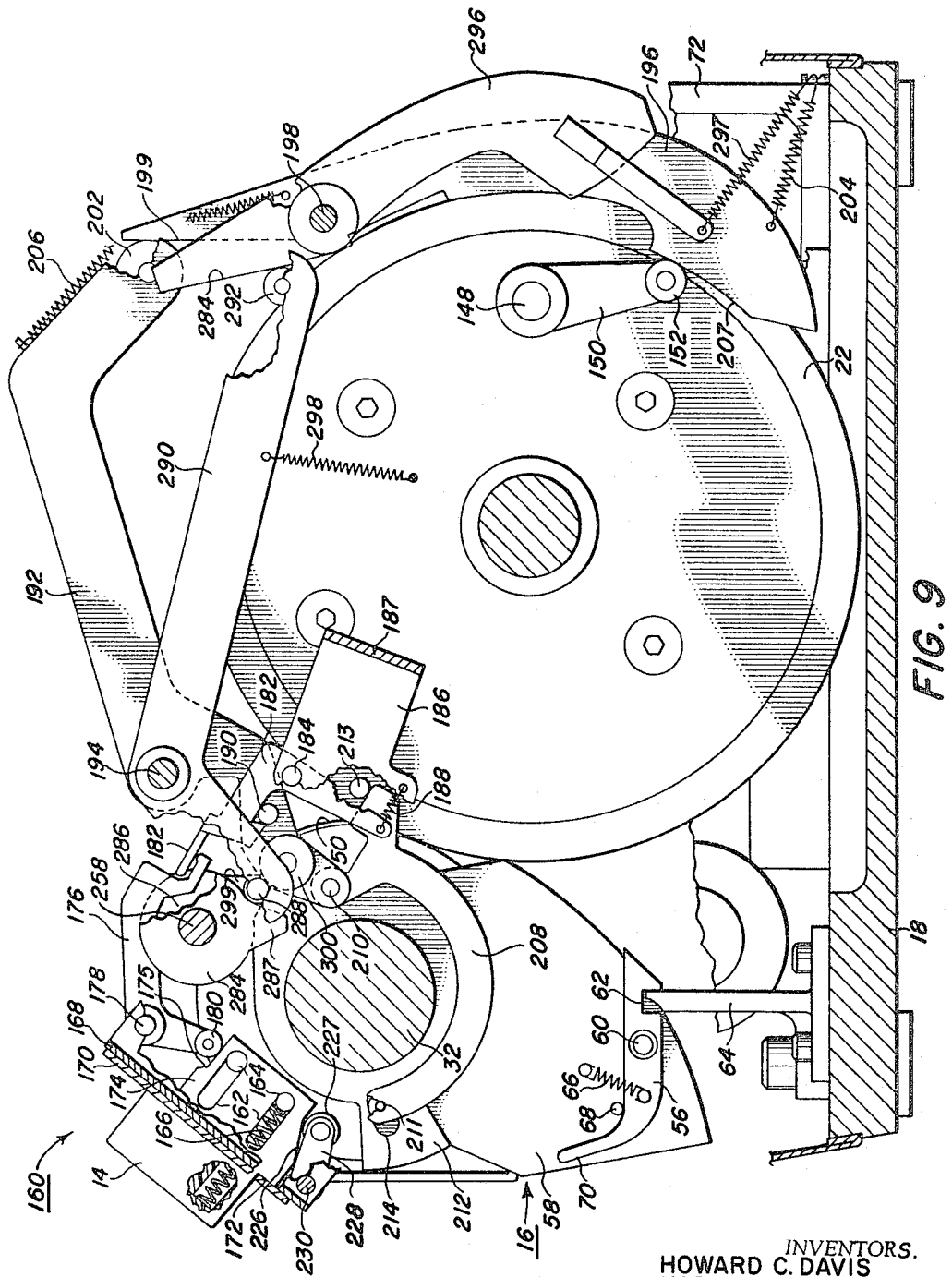
FIG. 9 is a sectional view of the machine taken along line 9—9 in FIG. 3 with parts broken away.

The strippers 52 and 54 on the paper exit guide 16 are maintained in operative relation with the pressure roller 30 and the drum 22 by a pair of paper exit guide locks 56 (see FIGS. 2 and 9). The paper exit guide locks 56 are pivotally mounted on end plates 58 of the paper guide exit guide 16 by means of pins 60 secured to plates 58. A slot 62 formed in each paper exit guide lock 56 engages a paper exit guide locking bracket 64 secured on the base 18 thereby maintaining the strippers 52 and 54 in operative relation with the roller 30 and the drum 22. A spring 66 secured at one end to each of the plates 58 and at the other end to the lock 56 maintains each guide lock 56 in engagement with each bracket 64 and against stops 68 mounted on the plates 58. The upper portion 70 of each guide lock is easily accessible from the front of the machine when the front covers are removed for permitting manipulation by the operator of the locks 56. The locks 56 are adapted for rotation counterclockwise as viewed in FIG. 9 for unlocking the paper exit guide 16, that is removing of the brackets 64 from the slots 62, for allowing clockwise rotation of the end plates 58 and consequently the paper guide 16. In this manner should a paper jam occur at this point, the paper guide may be removed to reposition the strippers 52 and 54 and permit clearing of jammed material.

Figure 3:
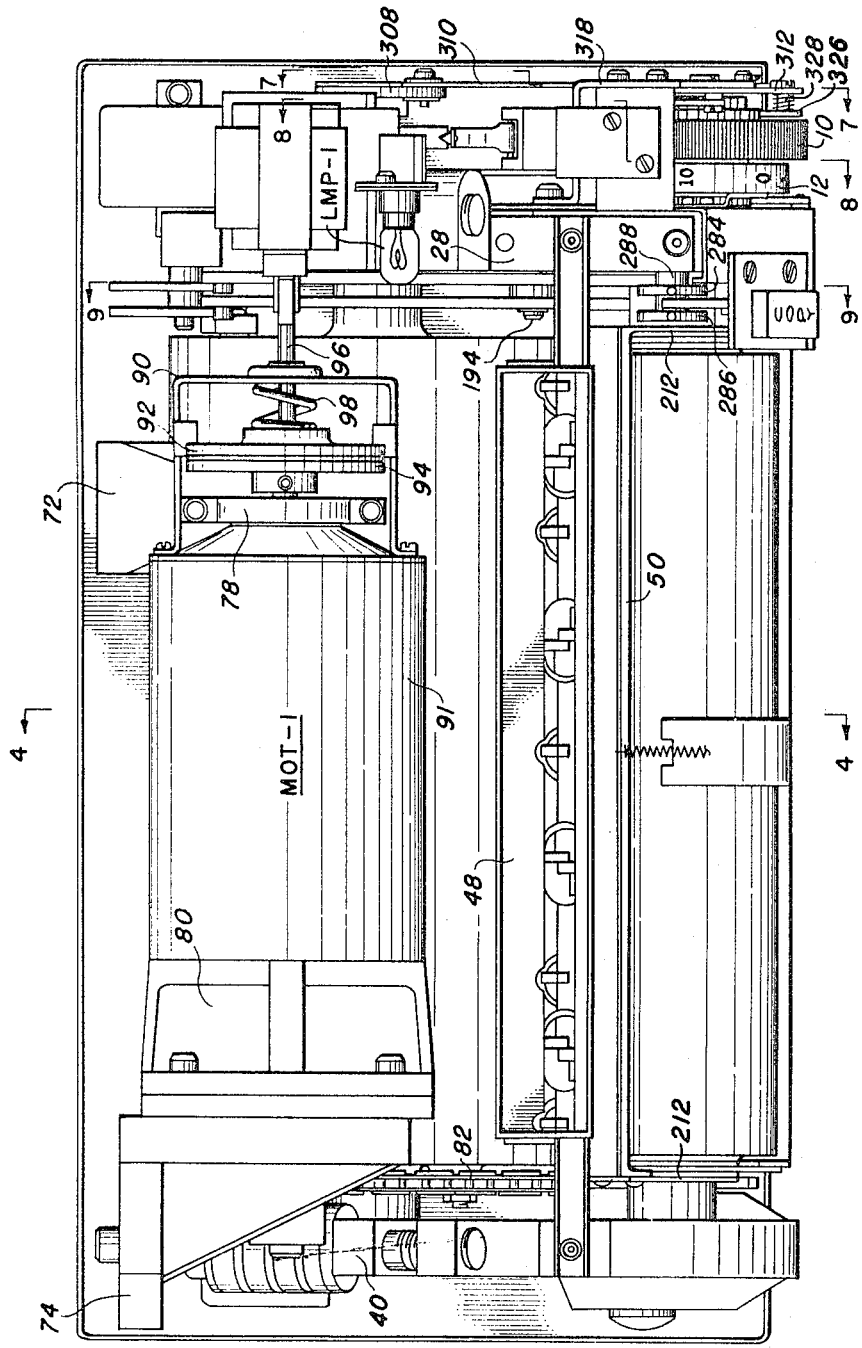
FIG. 3 is a top view of the machine.

A first support bracket 72 is mounted on the base 11 at the rear thereof and a second support bracket 74 is mounted on the left hand side bracket 20 (see FIG. 3). A motor MOT–1, for driving the drum 22, is supported thereabove by a support clamp 78 secured on the first support bracket 72 and by the second support bracket 74 secured on the bracket 20. The motor MOT–1 is provided with a gear reduction mechanism 80 mounted between the motor and the support bracket 74. The motor drives the drum 22 through a suitable chain 82 mounted between a drive gear 83 secured to the shaft of the motor and a sprocket 84 mounted on the left plate 24 of the drum.

The motor MOT–1 is provided with means for controlling rotation of its shaft and to serve as a brake for this rotation. This means includes a solenoid SOL–1 mounted on the upper portion 40 of the right hand support bracket 20 by a support member 88 and a braking device operable upon the motor when the solenoid is de-energized. The braking mechanism includes motor clamp 90 mounted to the right hand side of the motor casing 91 for slidably supporting a brake shoe 92 which cooperates with a brake disc 94 which is secured to the shaft of the motor to be rotated therewith. The solenoid SOL–1 is connected to brake shoe 92 for moving the same into and out of braking engagement with the brake disc 94 by means of a linkage comprising a brake link 96 connected to the solenoid armature and the brake shoe 92. The link 96 projects through a suitable opening formed in the clamp 90 and is normally biased by a spring 98 held in compression between the clamp 90 and shoe 92 in order to maintain the shoe 92 in engagement with the disc 94 when the solenoid SOL–1 is de-energized. The brake shoe 92 is actuatable when the solenoid SOL–1 is energized to become disengaged from the disc 94 to permit actuation of the motor drive and rotation of the drum, as will be discussed below.

The machine is provided with means for establishing positionable and operative relationships between a transfer sheet and an original or copy sheet which are introduced into the machine to effect programmed handling of the machine operation. These means include sheet registration devices and clamping devices as well as various operative mechanisms associated therewith.

Before commencing the description and operation of these devices, a brief outline of the sheet manipulation that occurs during the complete machine cycle will now be made. During the first stage of operation of the machine both a blank transfer sheet and an original which has been typed or otherwise imprinted with appropriate ink formulation, which will readily transfer from one sheet to another by the application of extreme pressures, are inserted into the nip of the drum-pressure roller combination. It is imperative at this step that the transfer sheet be applied so that it will be in contact with the drum 22 during rotation thereof. Both the transfer sheet and the original are driven through the nip of the drum-pressure roller and during the drive, which in this stage will be a single revolution of the drum, the transfer sheet will become clamped to the drum and remains so while the original is immediately stripped and directed out of the machine by means of the paper exit guide 16. Thus, the appropriate ink content on the original typed script or the image areas is transferred to the transfer sheet forming a mirror image of the image areas on the transfer sheet.

The next step in the cycle of operation requires the insertion into the machine of individual sheets of copy paper. During this stage the image on the transfer sheet is transferred to each copy sheet as they are inserted individually in the machine. During each transfer, the transfer sheet remains on the drum and the copy sheet is stripped out of the machine until the last programmed copy sheet has been made. As the last copy sheet is being stripped out, the transfer sheet is also being removed from the machine so that both sheets more or less are removed substantially simultaneously.

Figure 16:
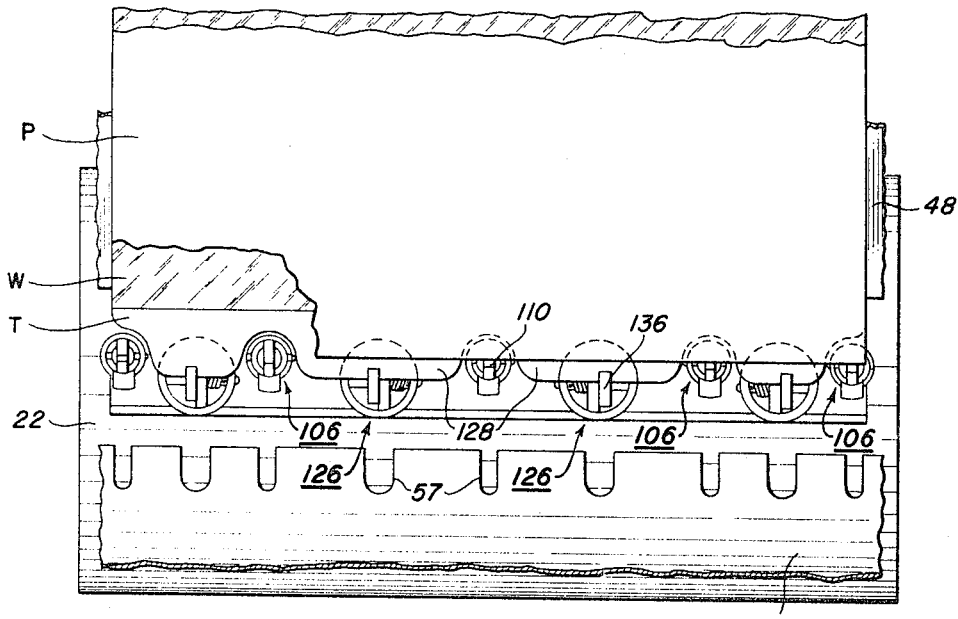
FIGURE 16 is a schematic illustration of the relationship of the transfer material, an original, and the structure used in cooperation therewith.

For automatically controlling positioning of the original sheet of material from which a transfer sheet will drive its inked image and for automatic positioning of subsequently applied sheets of copy paper, the drum 22 is provided with a plurality of registration devices 106 each having a registration pin 108 against which the leading edges of copy sheets or the original sheets abuts and which are arranged in a line parallel to the axis of the drum but coincident with the periphery thereof. As shown in FIG. 13, the registration pin 108 extends radially of the drum beyond the periphery thereof and is formed with a forward portion 110 which serves as a registration stop and against which the leading edge of an original or copy sheet is adapted to abut. The upper surface 111 aids in the removal or stripping of the original or copy sheet from the machine after a pressure transfer cycle. The registration device 106 is adapted to slide within a cylindrical element 112 which is tightly fitted into the openings 114 formed in the wall of the drum 22. As shown in FIG. 16, there are five registration devices mounted in openings 114 in the drum 22. These registration devices are arranged in a line parallel to the axis of the drum so that the stops 110 will be adapted to engage the leading edge of the original or copy sheet.

Means are provided for slidably retracting each of the pins 108 within the cylindrical element 112 and thus each of the pins 108 is formed with a slot 116 through which a fixed retaining pin 118 projects for permitting limited radial movement of pin 108 relative to the drum. The pin 118 may be secured to the walls of the cylindrical element 112. A lift means in the form of a spring 120 normally held in compression within the element 112 between a ledge 122 formed therein and the inner surface of the stop 110 normally biases the registration pin 108 outwardly and the stop 110 slightly beyond the periphery of the drum surface.

Figure 18:
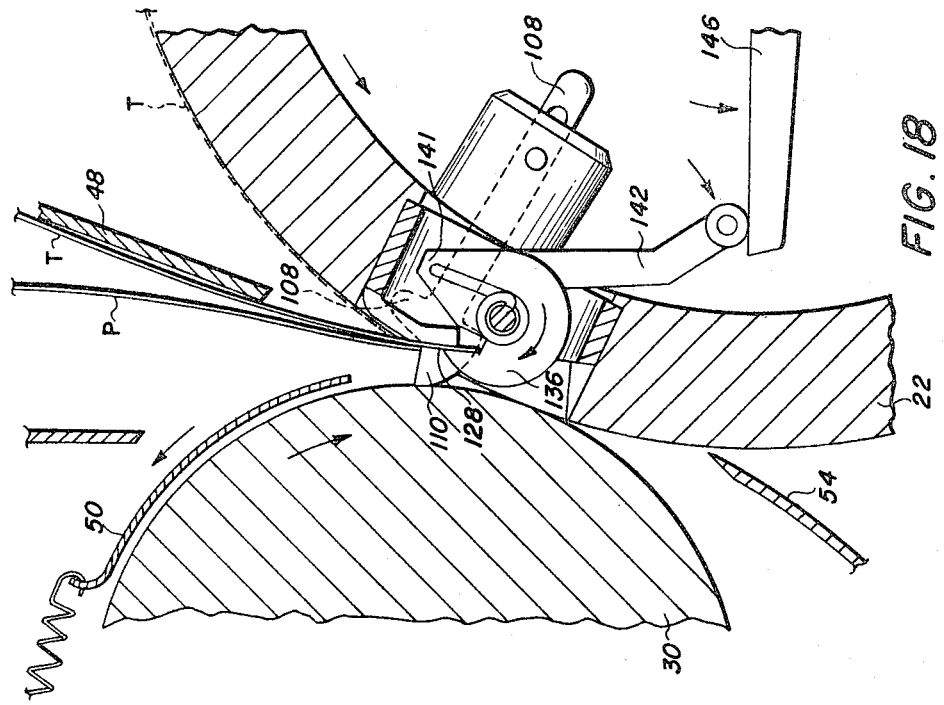
Figure 17:
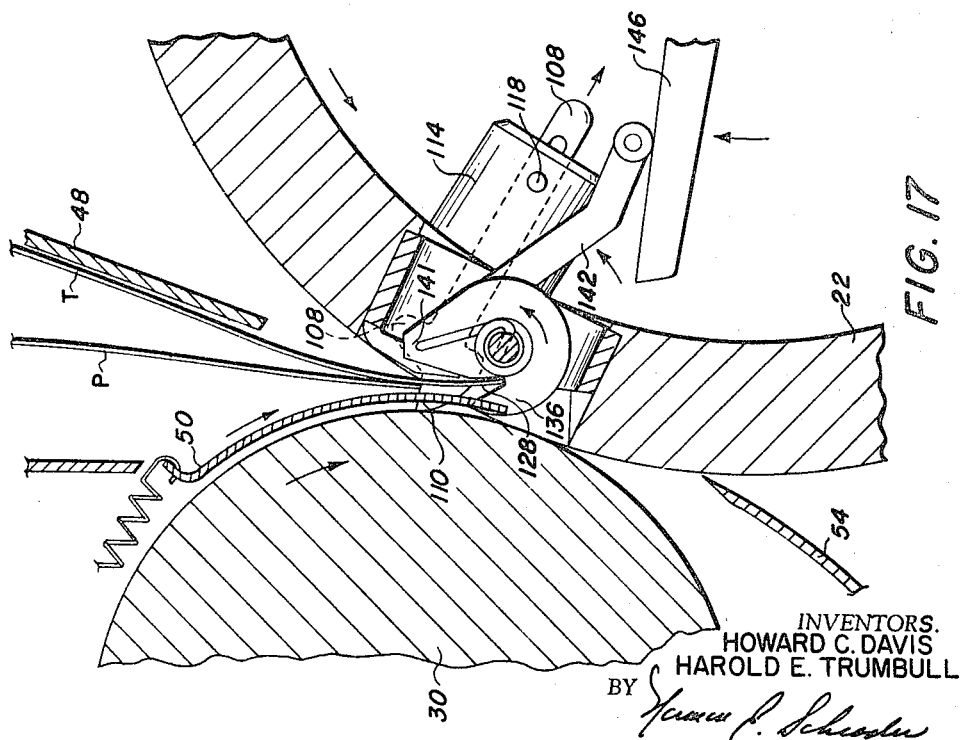

As shown in FIGS. 16, 17, and 18, the registration stops 110 are adapted to engage a sheet of material such as copy paper or an original P. The sheet P, when laid upon the paper tray 7, is guided by the chute 48 and when moved toward the nip of the drum-pressure roller combination is prevented from assuming any position except that shown in FIGS. 16 and 17. The illustrated position as shown in FIG. 17 is that assumed by the original P and the transfer sheet T just prior to initial operation of a reproducing cycle. The forward edge of the sheet P is shown in engagement with the registration stop 110 which is held slightly inward of the drum against the bias of the spring 120 by the pressure roller 30 in engagement with the uppermost points of the stops. The purpose of the registration stop 110 is to position the copy sheet or original P along the nip of the drum-pressure roller combination prior to commencement of the operation of the machine. As the registration stops 110 are moved through the nip of the drum-pressure roller combination, they are forced radially inwardly of the drum.

The drum 22 is also provided with a plurality of transfer sheet grippers generally indicated as 126 which serve to selectively clamp and support a transfer sheet, designated by the letter T, to be the drum periphery. These transfer sheet grippers 126 are spaced alternately with the registration device 106 and are arranged along a line parallel to these devices but spaced slightly forward therefrom. As shown in FIG. 16, the transfer sheet T is formed with a scalloped support edge having extensions 128 which are each applied to one of the grippers. Since there are four illustrated extensions 128 only four grippers are necessary. It is also shown in FIG. 16 that the grippers 126 and the registration devices 106 are arranged such that the scalloped edges 128 of the transfer sheet T leads, or is forward of the leading edge of the original or copy sheet P. The transfer sheet is provided with a wax coating W for the purpose described above for use in the indirect method of the pressure transfer process.

The details of one of the transfer sheet grippers are shown in FIGS. 14 and 15. Each gripper includes a cylindrical insert 132 mounted in a suitable circular opening 134 formed in the wall of the drum 22 and is formed with a plate portion 135 bent across the open end of the insert. Each of the transfer sheet grippers 126 includes a clamping device 136 rotatably mounted on a shaft 138 secured in the walls of cylindrical insert 132. The grippers support the transfer sheet between the clamping devices 136 and the surfaces 137 of the plate portions 135. A spring 140 is mounted on the shaft 138 and serves to normally rotate the device 136 to maintain the clamping device 136 in a closed position as shown in FIGS. 15 and 18. The gripping device 136 is formed with a portion 141 that rotates therewith about the shaft 138 for aiding in the ejection of the transfer sheet from the machine as described below.

Each clamping device is provided with an extension arm 142 which has a roller 144 mounted on the extreme end thereof. The roller 144 is adapted to ride on transfer lock pivot arms 146 as shown in FIGS. 11 and 12. The pivot arms 146 are mounted on a shaft 148 mounted within the drum 22 on and between the side plates 24 in parallelism with the axis of the drum. Rotation of shaft 148 and consequently the levers 146 is effected by a transfer lock shaft actuator 150 secured to the shaft externally of the drum at one end thereof (see FIG. 11). The actuator 150, in turn, is rotated by a programming mechanism to be described hereinafter which is operable upon a roller 152 which is mounted on the end of the actuator 150.

As the roller 152 is contacted by the programming mechanism, the transfer lock shaft actuator 150 rotates the shaft 148 thereby pivoting the arms 146 in a clockwise direction as shown in FIG. 12. Each of the arms 146 contacts one of the rollers 144 mounted on the extension arm 142 of the clamping device 136 and rotates this arm in a conunterclockwise direction about the shaft 138 against the biasing action of the spring 140. This, in turn, will rotate the device 136 about the shaft 138 for releasing the extensions 128 of the transfer sheet T. The clamping devices 136, which remain in a normally closed position, are opened twice during the operation of the last reproduction cycle. They are opened when the machine comes to and remains at rest as shown in FIG. 17 thereby in condition for accepting a transfer sheet prior to operation of the machine. The clamping devices are also opened during the last cycle of operation at which time the gripper is opened by the programming mechanism to positively position the transfer sheet to be stripped out of the machine along with the last copy sheet made.

The reproduction machine is provided with a programmer mechanism 160, as shown in FIG. 9, which controls the operation of the machine once it is set in motion and in cooperation with a copy counting mechanism, a copy indicating mechanism, and an electrical control circuit. The programmer mechanism 160 illustrated in operative detail in FIGS. 21–24, is located on the right-hand side of the machine and comprises a number of control levers which assume various motions and positions during a single and complete reproduction cycle. Such a reproduction cycle requires at least two complete rotations of the drum 22, one to produce a mirror image on the transfer sheet and one revolution to produce one copy from the transfer sheet. The structure of the programmer mechanism and the copy indicating mechanism is such that every produced copy desired requires one full rotation of the drum. For any series or multiple copy program, there will be as many drum rotations as there are programmed copies to be made plus one additional rotation to produce the transfer sheet.

The machine is shown in the normally off position in FIGS. 4, 6, 7, 8, 9, and 10. The machine in this position is ready to be programmed for operation and ready for actuation of the programmer mechanism and the push button 14.

After the thumb wheel 10 has been set, as described below, the push button 14 is then ready for operation. The indicator light 8 is turned on as described below, indicating that the machine is ready to accept a transfer sheet and an original.

The push button 14 is provided with slots 162 therein which ride on fixed pins 164 as it is depressed. The push button 14 is normally held in the outward position as shown in FIG. 9 by a spring 166 mounted in one of the slots 162 between the pins 164 and an internal surface of the button. The pins 164 are mounted on a bracket 168 which also supports the button 14. The bracket 168 has a retaining element 170 that contacts a stepped portion 172 formed on the push button for positioning and retaining the same in the bracket 168.

The push button 14 is formed with a cam surface 174 which is adapted to operate a shutter gripper release link 176 in the form of a bellcrank pivotally mounted upon a pivot 178 secured to the bracket 168. A roller 180, mounted on the adjacent end of the bellcrank 176, rides a cam surface 174 as the button is depressed until it contacts an inclined step portion 175 thereon for rocking the bellcrank about the pivot pin 178. The other end of the bellcrank 176 contacts one end of a gripper lock 182 also in the form of a bellcrank pivotally mounted about a pivot pin 184 secured to a bracket 186. The bracket 186 is secured by a flange 187 to the right-hand side bracket 20 (see FIG. 7) in order to maintain the pivot pin 184 for the gripper lock in a fixed position. The gripper lock 182 is biased by a spring 188 secured between the other end of the gripper lock bellcrank 182 and the bracket 186 in the counterclockwise direction as shown in FIG. 9 in order to maintain the other end of the lock 182 in engagement with the adjacent end of the link 176.

It will be understood that as the link 176 is rotated by the engagement of the roller 180 upon the step 175 will produce clockwise rotation of the bellcrank lock 182.

One edge of the gripper lock 182 normally engages a transfer cam lock link pin 190 mounted on a transfer cam lock link 192 by the biasing action of the spring 188. The transfer cam lock link 192 is pivotally mounted on a pivot pin 194 secured in a fixed position on the right-hand side roll support 28.

With the bellcrank 176 held in a fixed position by the engagement of the roller 180 to the cam surface 174, the bellcrank 182 is also fixed and thereby remains normally locked against the pin 190. Locking of the pin 190 prevents movement of the link 192 in the clockwise rotation. Upon the release of the pin 190 by depression of the button 14, the link 192 is free to rotate in a clockwise direction.

The transfer cam lock link 192 serves a dual function: (1) to close the transfer grippers 126 and (2) to retract the shutter 50. In accomplishing this first function, the transfer cam lock link 192 is operatively associated with a transfer insert actuator lever 196 pivotally mounted on a pin 198 secured to the right-hand side support 20. The upper end of the lever 196 is formed with a cam edge 199 adapted for engagement with a roller 202 mounted on the extreme end of the lever 192. A spring 204 attached to the base 18 and the lever 196 maintains the cam edge 199 in contact with the roller 202 for all positions of the elements 192 and 196. A spring 206 attached between the transfer cam lock link 192 and the transfer insert actuator lever 196 normally biases the link in a clockwise direction and accomplishes this without affecting the action of the spring 204 in keeping the cam edge 199 on the roller 202. The roller 202 on transfer cam lock link moves along the cam surface 199 of the transfer insert actuator lever 196 for imparting limited rocking movement of the latter. At the lower end of the lever 196, there is formed a cam surface 207 which is adapted to engage the roller 152 on the actuator 150.

As will be described below, during a stage of the reproduction cycle, the roller 152 will engage the surface 207 which limits movement of the actuator to produce a slight rotation of the actuator 150 to open the clamping devices 126 to the position shown in FIG. 17.

In the event the link 192 is rotated clockwise the roller 202 will slide downwardly along the cam surface 199 for permitting counterclockwise rotation by the lever 196 by the spring 204 to remove the surface 207 from the path of movement of the roller 152 thereby permitting unrestricted closing of the clamping devices 126 by means of the springs 140.

During the second function of the lock link 192 in retracting the shutter 50, the locking link 192 releases a shutter actuator link 208 from its normally held position as shown in FIG. 9, wherein the shutter link 208 holds the shutter 50 in a releaseably held position. In order to accomplish this action, the lock link 192 is pivotally connected by a pin 210 to one end of the shutter link 208 which is pivotally connected by a pin 211 at the other end to a paper guide shutter actuator 212 secured to the shutter 50 (see FIGS. 9 and 10). The shutter 50 is supported for rotation about the shaft 32 of roller 30 by the shutter actuator 212 one mounted on each end thereof.

As the pin 190 is released by the rocking of the gripper lever lock 182, the transfer cam lock link 192 will rotate in a clockwise direction thereby moving the shutter link 208 out of a releaseably fixed position provided by its contact with a pin 213 mounted on the drum 22 as shown in FIG. 9. When the machine is not in operation, the pin 213 abuts the adjacent end of the link 208 to maintain the same and the actuator 212 in the position shown in FIG. 9 wherein the shutter 50 is in a closed position as shown in FIG. 17. While in a closed position, the shutter 50 serves as a paper guide along with the paper guide 48.

Figure 21:
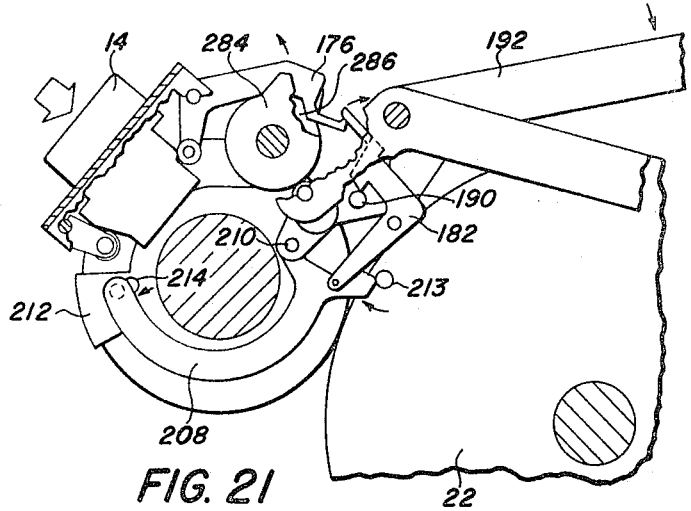
Figure 22:
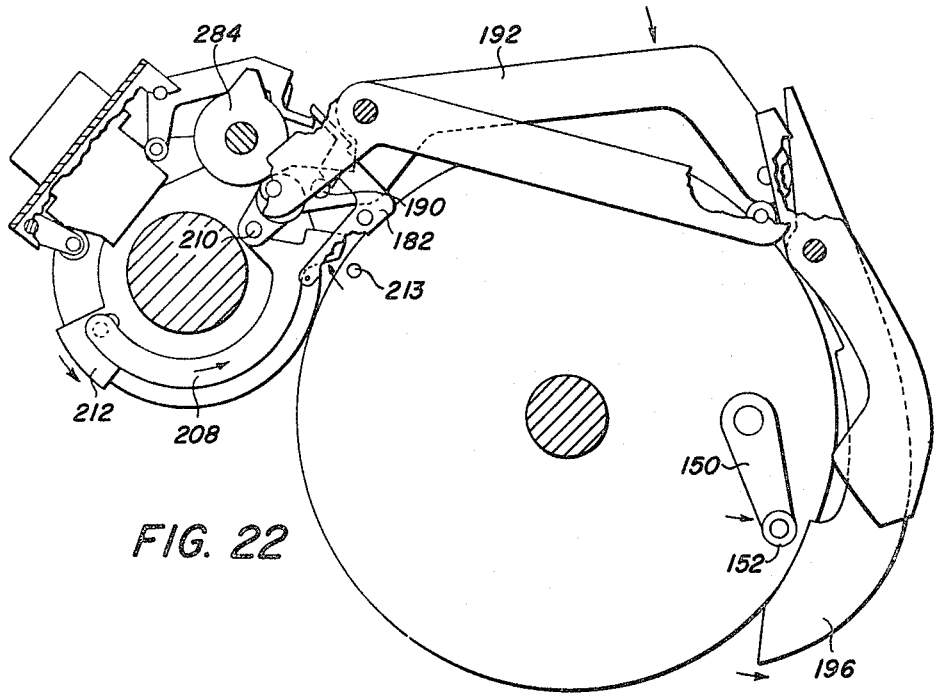

As the link 192 is rotated in a clockwise movement, it moves the link 208 out of interfering relation with the pin 213, wherein the link 208 is free to swing to the right from the position shown in FIG. 21 to the position shown in FIG. 22, as indicated by the arrow. This action is possible by the provision of the pivot pins 210, 211 and the slot 214 formed in the actuator 212 and adapted to accommodate the pin 211. Swinging of the link 208 to the right produces limited rotation of the actuator 212 for opening the shutter 50 to the position shown in FIG. 18.

Figure 10:
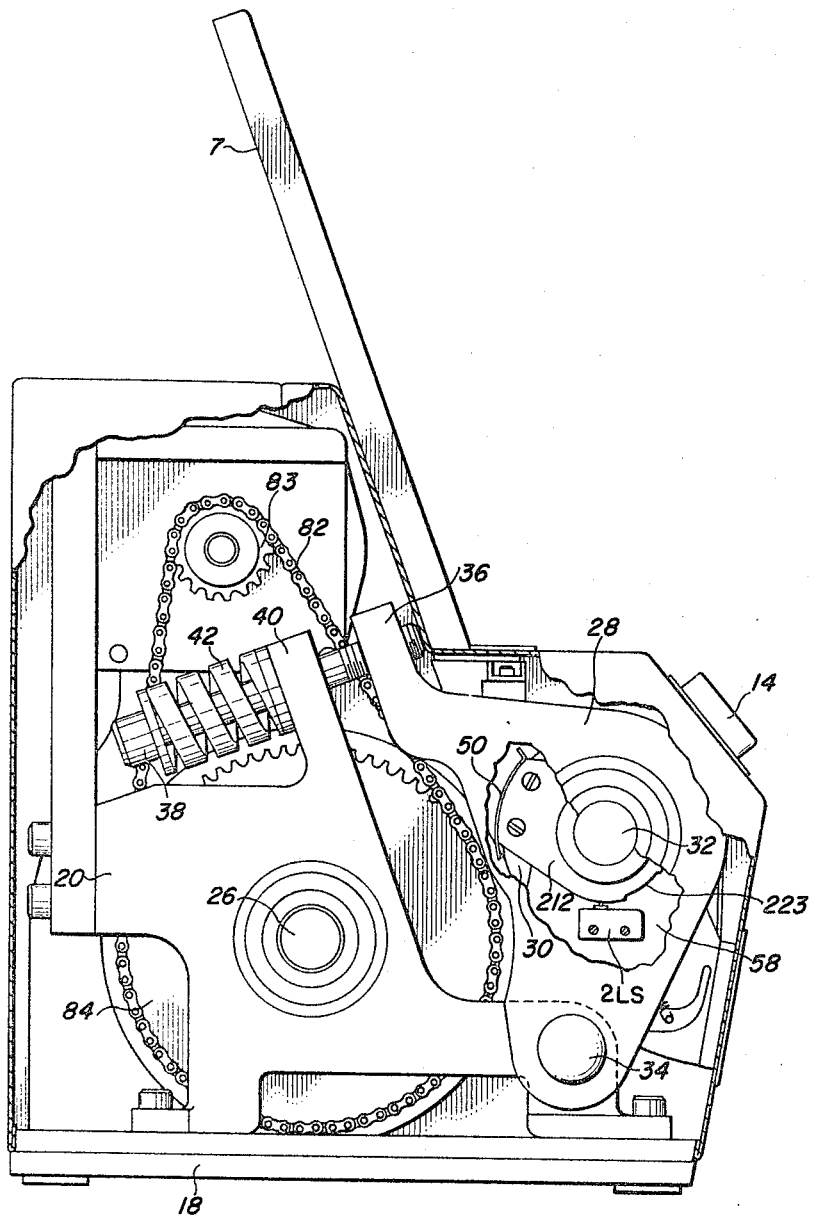
FIGURE 10 is a left-hand view of the machine with parts broken away.

As shown in FIG. 4, the paper guide shutter 50 is biased by a spring 222 in the counterclockwise direction to normally hold the shutter in its open position. The spring 222 may be mounted on a bracket 224 attached to the paper exit guide 16 and one edge of the shutter. A switch 2 LS is mounted on the end 58 of the paper exit guide 16 (see FIG. 10) and has its actuator in engagement with a suitable edge of the actuator 212. When the shutter is in the closed position as indicated in FIG. 10 the switch 2 LS is in its open position. When the shutter is moved to its open position, the actuator for the switch will be moved to permit closing of the switch by its movement into a dwell 223 formed on the edge of the actuator 212 for a purpose to be described hereinafter.

At this point, as shown in FIG. 22, the push button 14 has performed the first of 2 series of operations. In this first series, the programming mechanism 160 as shown in FIG. 22 has released the paper guide shutter 50 and closed the transfer grippers 126. This series of operations is performed to clamp the edge of the transfer sheet extension 128 as a step preceding machine actuation. It is noted that the paper guide shutter actuator 212 will close the switch 2 LS connected to the energizing circuit for the motor MOT-1 and the solenoid SOL-1.

Figure 8:
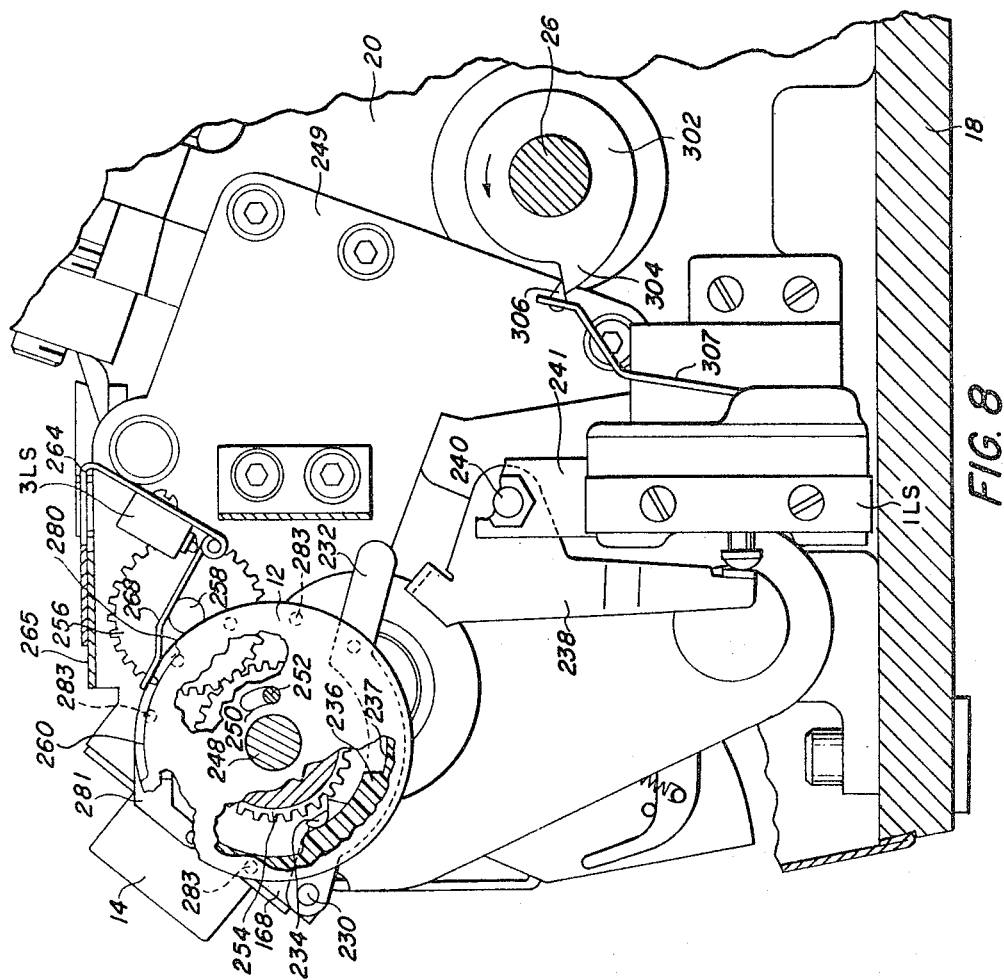
FIG. 8 is a sectional view of the machine taken along the line 8—8 in FIG. 3 with parts broken away.

The push button 14 is also formed with an inclined cam portion 226 which contacts and operates a roller 227 mounted on a push button start lever 228 (see FIG. 9). The start lever 228 is rigidly connected to a shaft 230 rotatably mounted in the bracket 168 (see FIG. 8) and rotates this shaft 230 in a clockwise direction when the button 14 is depressed. The shaft 230 also has secured thereon a switch lock and link member 232, as shown in FIG. 8. This member 232 has a protruding portion 234 which rides on the raised portion 236 of a cam surface 237 formed internally of copy indicator and setting wheel 12. The raised portion 236 must be moved out of interfering relation with the protruding portion 234 in order to actuate the push button 14 as described below.

The member 232 serves to rotate a switch operator 238 mounted on a fixed pivot 240 secured to a fixed bracket 241. The switch operator is adapted to engage a switch button 246 on a normally open switch 1 LS for actuation of the same to its closed condition.

Figure 7:
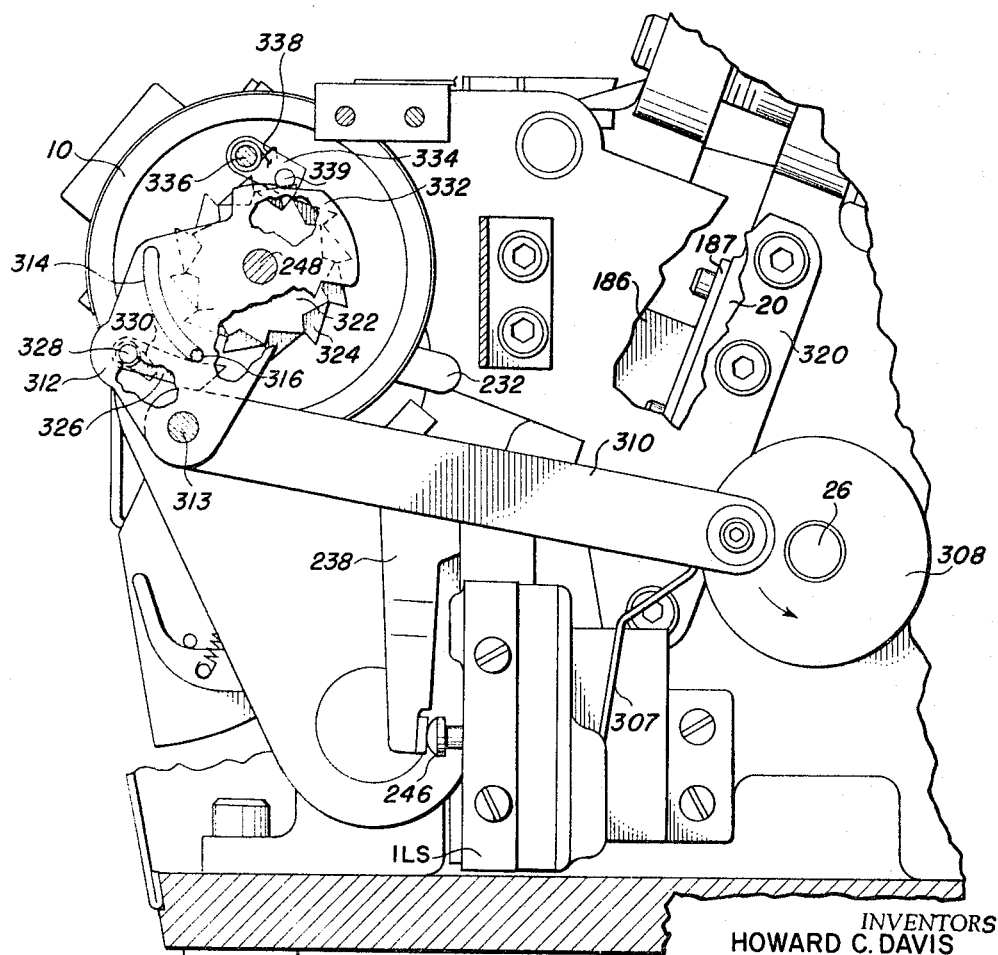
FIG. 7 is a sectional view of the machine taken along the line 7—7 in FIG. 3 with parts broken away.

Prior to inserting a transfer sheet and an original to be copied, it is necessary to set the number wheel 12 indicating the number of copies desired by rotating the thumb wheel 10 in a counterclockwise direction as shown in FIG. 7. The thumb wheel is rigidly mounted on a shaft 248 rotatably secured to bracket 249 mounted on the side bracket 20. The thumb wheel is formed with a radial slot 250 which extends in an arc of 30° and which has extending therein a pin 252 secured to the number wheel 12. The number wheel 12 is rotatably mounted on the shaft 248 and thus the thumb wheel is able to move clockwise through an arc of 30° before contacting and thereby engaging the pin 252 and driving the number wheel 12 therewith. After contacting the pin 252 the thumb wheel 10 drives the number wheel 12 thereby indicating the number of copies desired to be reproduced to the operator.

A driving gear 254 is rigidly mounted on the shaft 248 and is in mesh with a driven gear 256 which is mounted on shaft 258 for driving the same when the thumb wheel is rotated in a counterclockwise direction. The shaft 258 is rotatably mounted on and between the side support 28 and the bracket 249.

The number wheel 12 is formed with a depression 260 (see FIG. 8) which is utilized to actuate a ready light switch 3 LS mounted on a bracket 264 which is attached to a plate 265 on the bracket 249. A ready light switch lever 268 for actuating the switch 3 LS is pivotally mounted on the bracket 264 and rides in the depression 260 of the thumb wheel.

When the number wheel 12 is rotated through an arc of 60° the pin 252 thereon rotates the number wheel 12, through an arc of 30°, and indicates the digit "1" on the number wheel to the operator. Thus an initial rotation of 60° of the thumb wheel will move the number wheel 30° to indicate the digit "1" thereon. For each additional 30° rotation of the thumb wheel 10, the number wheel 12, moves to indicate an additional digit. When the thumb wheel 10 has been rotated 60°, the depression 260 on the thumb wheel moves past the position whereby the ready light switch lever 268 rides therein upon the surface 280 of the number wheel 12 and rotates the ready light switch lever 268 to actuate the ready light switch 3 LS to close the circuit to a lamp LMP-1 to indicate to the operator that the machine is ready for operation.

The number wheel is formed with a plurality of depressions 283 spaced at 30° intervals along the peripheral thereof and these depressions cooperate with a spring dent 281 mounted on its bracket 267. In this manner the number wheel may be releasably held in each of its number indicating positions. The driven gear 256 is rigidly attached to the shaft 258 and rotates the same as the driving gear 254 is rotated by the thumb wheel 10. The driving gear is also rotated by a drive means to be described presently.

The shaft 258 also has secured thereto a transfer eject cam 284 and a transfer insert cam 286 (see FIG. 9). As the thumb wheel is rotated in a clockwise direction, the shaft 258, and therefore the transfer eject cam 284 and the transfer insert cam 286, is also rotated through the gears 254 and 256 in a counterclockwise direction (see FIG. 8). As the transfer eject cam 284 is rotated, a cam lobe 287 formed thereon contacts a roller 288 on an eject link 290 which is rotatably mounted on the shaft 194. Thus counterclockwise rotation of the cam 284 rotates the eject link in a counterclockwise direction for moving a roller 292 mounted on the other end of the link 290 along a surface 294 of a transfer eject actuator lever 296 which in turn, is pivotally mounted on the pivot pin 198.

A spring 297 secured to the base 18 is attached to the eject lever 296 at the lower end thereof and maintains the lever 296 in contact with the roller 292.

A spring 298 continuously maintains the roller 292 on the surface 294 of the eject lever 296. Thus the transfer eject cam 284 and its lobe 287 operate through the eject link 290 to operate eject lever 296. The purpose of the transfer eject actuator lever 296 and the linkage actuated thereby will be described below.

The transfer insert cam 286 has a cam lobe 299 which engages a roller 300 rotatably mounted on the link 192 adjacent the pin 210. When the cam 286 is rotated in a counterclockwise direction (see FIG. 9), the lobe 299 is moved out of interfering relation with the roller 300. As previously stated, the gripper lever lock 182 holds the pin 190, and consequently transfer lock link 192 in the position shown in FIG. 9. When the transfer insert cam 286 is moved out of interfering relation with the pin 300 on the link 192, the gripper lock lever 182 still holds the link 192 in place and thus the insert actuator lever 196 in the position shown in FIG. 9 to hold the grippers 126 open. As previously stated, the cam surface 226 of the push button 14 operates the push button start lever 228 for actuating the switch 1 LS through the switch operator 238 thereby commencing operation of the machine. It is noted that the cam surface 174 of the push button 14, when depressed, will release the transfer insert actuator lever 196 through the shutter gripper release link 176, the gripper lock lever 182 and the transfer cam lock link 192, thereby closing the transfer grippers 126 prior to the cam action of the cam surface 226 and prior to commencing operation of the machine.

When the switch 1 LS is actuated by the operator 238, it closes the circuit to the brake solenoid SOL-1 and the motor MOT-1 connected in parallel with solenoid. Closing of the switch, also pulses the counter C-1 to indicate that the machine has been operated through one production stage of a cycle. It is noted that the switch 2 LS mounted, adjacent and actuated by the shutter 50, as previously described, must be closed prior to the closing of the switch 1 LS in order to affect energization of the motor MOT-1 and the solenoid SOL-1. Energization of the solenoid releases the brake disc 94 allowing the motor to drive the drum and as the motor commences operation, it rotates the drum in the counterclockwise direction as shown in FIG. 4.

The machine is provided a drive mechanism for indexing the wheels 10, 12 and the cams 204, 206 and for positioning the programming structure in proper operative positions driving a complete copying and reproduction cycle. To this end a cam 302 is rigidly mounted on the drum shaft 26 and rotatable therewith for initiating the drive function. As the drum completes one revolution it rotates the cam 302 in a counterclockwise direction as viewed in FIG. 8 to position the cam lobe 304 thereon against a cam follower 306. At the end of a complete revolution of the cam and the drum 22, the high point 304 moves a second switch actuator 307 for the switch 1 LS for opening the switch and thereby de-energizes the motor MOT-1 and the solenoid SOL-1.

The switch 1 LS as previously stated is actuated to a closed condition by the momentary actuation of the operator 238 when the button 14 is momentarily depressed. This switch remains in a closed condition when the operator 238 is released. The switch 1 LS is also provided with a second actuator 307 which when momentarily tripped by the cam 302 reopens the switch. With the solenoid de-energized, the brake 92, 94 is actuated to stop further any rotation by inertia of motor, thereby stopping the drum instantly at the position shown in FIG. 4. When the cam 302 is in the dead stop position as shown in FIG. 8, the drum is also in the dead position as shown in FIGS. 4 and 9.

Also attached to the drum shaft 26 and rotating therewith is a crank wheel 308 (see FIG. 7) having pivotally attached thereto an operator link 310 for moving an actuating lever 312 pivotally attached thereto by a pin 313. The actuating lever 312 is rotatably mounted on the shaft 248 which as previously stated rotates with the wheel 10 and gear 254. When drum rotates thereby rotating the crank wheel 308 in a counterclockwise direction, the actuating lever 312 is rotated in a counterclockwise direction about the shaft 248. The actuating lever 312 is formed with a slot which slidably cooperates with a pin 316 rigidly connected to a bracket 318 mounted on the fixed plate 249 (see FIG. 6).

The actuating lever 312 serves to drive a pair of ratchets, namely, a locking ratchet 322 and a driving ratchet 324, rigidly secured to the shaft 248. To this end the lever 312 is provided with a driving pawl 326 pivotally mounted on the lever 312 by a pivot pin 328. The pawl 326 is urged in a counterclockwise direction against the driving ratchet by a spring 330.

Figure 6:
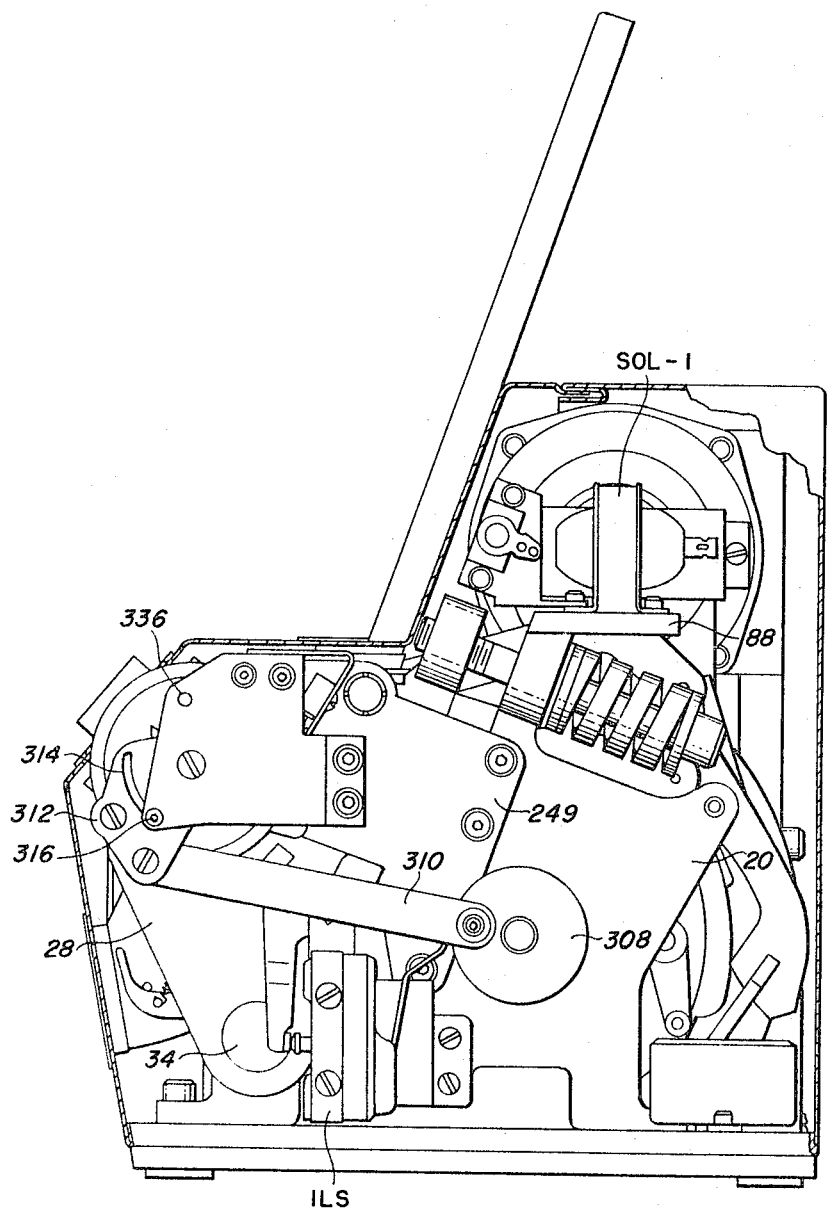
FIG. 6 is a right hand view of the machine with parts broken away.

The lever 312 is provided with a cam surface 332 adapted to cooperate with a locking pawl 334 rotatably mounted on pin 336 secured to the bracket 318 as shown in FIGS. 6 and 7. The locking pawl 334 is normally held in engagement with the teeth of the locking ratchet 322 by a spring 338 for preventing inadvertent rotation of the thumb wheel, however, this pawl is cammed out of locking condition by the cam surface 332 acting on a cam follower 339 secured to the pawl when the lever 312 is moved to index the driving or indexing ratchet 224. As shown in FIGS. 7 and 25, as the actuating lever 312 is rotated in the counterclockwise direction, the cam surface 332 pivots the pawl 334 out of interfering relation with the locking ratchet 322. It is noted that there is a slight delay in the engagement of the pawl 326 with the ratchet 324 as the indexing action and therefore rotation of the shaft 248 for the purposes to be described below.

In this manner, the shaft 248, which has mounted thereon the thumb wheel 10 and the driving gear 254, is moved through an arc of 30° for each indexing action of the pawl 326. On the return stroke of crank wheel 308, the actuating lever 312 is rotated clockwise whereby the indexing pawl 326 engages the pin 316 and the upper cam portion 332 of the actuating lever 312 releases the pin 336 allowing the locking pawl 334 to return to the position shown in FIG. 7, that is, in interfering relation with the locking ratchet 322. In this manner then, it is possible to turn the thumb wheel in a clockwise direction. It can readily be seen that while the driving pawl 326 indexes the driving ratchet 324 and the thumb wheel in a counterclockwise direction, the pin 252 on the thumb wheel will not engage the end of the slot 250 on the number wheel 12 during the first rotation of the crank wheel 308. During the initial setting of the thumb wheel, the pin 252 was moved to the upper end of the slot 250 (see FIG. 8). The first full rotation of the crank wheel 308 and therefore on the drum 22 serves to move the pin 252 to the lower end of the slot 250 which action requires a 30° movement of the thumb wheel. This allows insertion of an original and a transfer sheet during the first stage of a cycle operation of the machine so that the drum can make a revolution without disturbing copy setting indication.

*Machine Operation*

The machine is shown in the normally off position in FIGS. 7, 8, 9, 10 and 17. To operate the machine the thumb wheel 10 is rotated in a clockwise direction as shown in FIGS. 8 and 9 through, for example, an arc of 120° to indicate that three copies are to be produced on the machine. The thumb wheel is rotated 30° for each copy to be made plus the initial additional 30° to allow for the production of the transfer sheet T from an original while still indicating the three copies to be made on the number wheel.

When the thumb wheel has been turned 120°, the programming mechanism is actuated such that the transfer eject cam 284 and transfer insert cam 286 are moved to the position shown in FIG. 21. At this time, the machine is ready to accept a transfer sheet and an original for the purpose of transferring the image from the original to the transfer sheet. The transfer grippers 126 are in the position shown in FIG. 17, ready to accept the transfer sheet T and an original P. After a transfer sheet T and an original P has been placed in the machine as shown in FIG. 17, wherein, the leading edge of the sheet P is against the registration stops 110 and the extensions 128 on the transfer sheet T are against the clamping devices 136 the push button 14 is depressed to perform two actions. The first action releases the bellcrank 182 which released the transfer cam lock link pin 190 for permitting clockwise rotation of the transfer cam lock link 192 or from the position in FIG. 9 to the position shown in FIG. 22. This rotation of the link 192 moves the roller 202 along the cam surface 199 on the transfer insert actuator lever 196 causing clockwise rotation of the same for forcing the cam surface 207 away from the lock shaft actuator 150 thereby closing the clamping devices 136 as shown in FIG. 18. In this manner, the transfer sheet T is positively clamped to the drum for support thereby during the rotation thereof.

As the link 192 is released the shutter link 208 is moved out of interfering relation with the pin 213 as shown in FIG. 21. After the shutter link 208 has been moved out of interfering relation with the pin 213, the shutter link 208 is adapted to swing to the right to actuate the paper guide shutter actuator 212 for retracting the paper guide shutter 50. Movement of the paper guide shutter actuator 212 also causes the closing of the switch 2LS (see FIGS. 10 and 26).

The second action of the push button 14 actuates the push button start lever 228 actuated by the lower portion of the push button 14 thereby actuating the switch 1LS through the switch operator 238. With the sheets P and T in the positions shown in FIG. 18 and with the switches 1LS and 2LS now both closed the drum drive motor MOT–1 is energized and the counter C–1 is pulsed.

As the drum 22 is rotated by the drive motor, the crank wheel 308 is rotated to move the linkage 310, 312 connected thereto (see FIGS. 7 and 25). Through this driving mechanism the driving pawl 326 drives the driving ratchet 324 for one tooth thereon 30° and therefore the shaft 248 connected thereto. The shaft 248, having the driving gear 254 rigidly attached thereto, thereby drives the driven gear 256 rigidly secured to the shaft 258 for rotating the same in a clockwise direction. Also attached to the shaft 258 are the transfer eject cam 284 and the transfer insert cam 286. Thus for each rotation of the drive shaft 26 and the shaft 258 are moved 30° in a counterclockwise and clockwise direction respectively.

As shown in FIGS. 21 and 22, the machine has been set for the production of three copies. This is shown by the setting of the cams 284, 286 which have been moved a total of 120°. During the first stage of operation, the original is transported through the machine and the transfer sheet is wrapped around the drum where it remains for the complete production cycle. However, during this stage the cams 284 and 286 are rotated 30°. At the same time, the thumb wheel will be rotated in a counterclockwise direction 30°. However, the number wheel 12 at this point will not be moved due to play between the pin 252 on the number wheel and slot 250 in the thumb wheel.

As the leading edge of the original is transported through the nip of the drum-pressure roller combination, the registration pins 108 in moving through the nip are fully retracted. The registration pins will project outwardly when moved out of the nip to allow the surface 111 to raise the forward edge of the original a sufficient distance as the drum is rotated to allow this stripper 54 to pick off the original and conduct it out of the machine. This action occurs when the original is moved to the position shown in FIG. 19. This stripping action of the original is also performed on each of the copy sheet in exactly the same manner except for the last copy produced which action will be described below.

With the original now out of the machine and the image thereon transferred to the transfer sheet by the high linear pressure between the drum 22 and the pressure roller 30, the machine is now ready to accept a copy sheet for the reproduction of the image. A copy sheet P is fed into the machine exactly as the original during the first stage of operation. In this case, however, the transfer sheet would be in the position shown by the dotted lines in FIG. 18, and the copy sheet P would be in the position substantially as shown. The transfer sheet remains clamped to the drum by the clamping devices 136 while each copy sheet P is fed through the machine.

Figure 23:
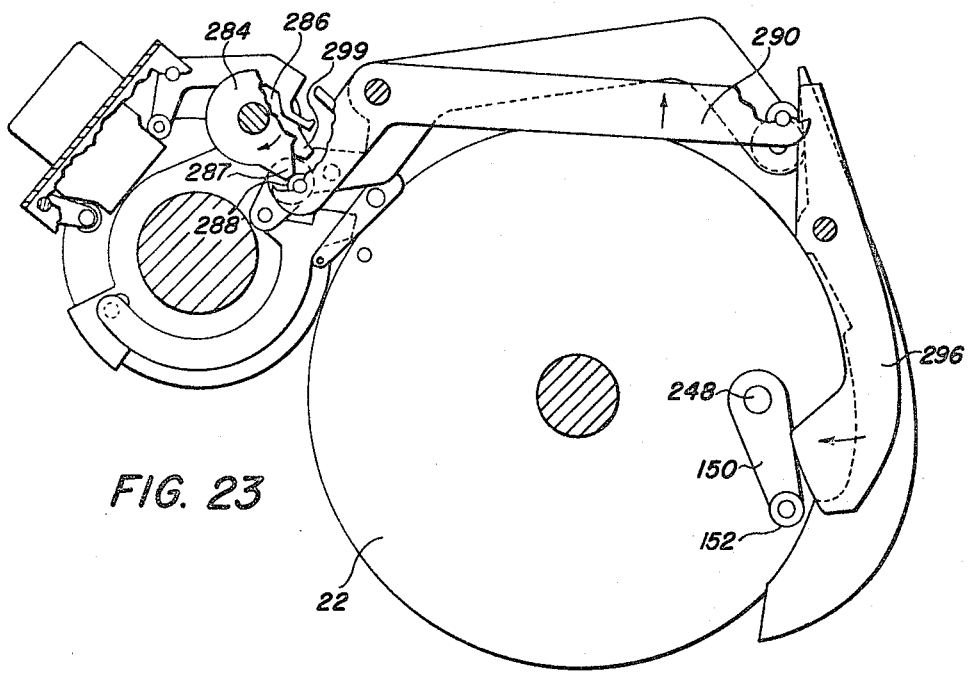

As the first copy sheet is fed into the machine to receive a transferred image thereon, the driving mechanism through the crank wheel 308 and linkage attached thereto rotates the driving gear 254 which rotates the driven gear 256 for rotating the shaft 258. This action rotates the transfer eject cam 284 and a transfer insert cam 286 30° and continues to do so for each succeeding copy. As the next to the last copy, in this case the second copy, is moved through the machine, the transfer eject cam 284 moves 30° or, for a total of 90° from the position shown in FIG. 22 to the position shown in FIG. 23 since 3 copies have been dialed. At this time the lobe 287 on the transfer eject cam 284 contacts the roller 288 on the transfer eject cam link 290 which moves the transfer eject actuator lever 296 into the position indicated in FIG. 23. It is noted, however, that this motion of the transfer eject actuator lever 296 occurs after the transfer lock shaft actuator 150 has passed the position of the transfer eject actuator lever 296. This is due to the delayed action of the pawl 326 as described above. The lever 296 then has no effect upon the paper gripper devices at this point of the operation. Thus at the end of the second from the last copy sheet made, the programming mechanism will be in the position as shown in FIG. 23. The machine is now ready to accept the last copy sheet or the third copy sheet in the present illustration.

As the last copy sheet is fed into the machine and the drum is rotated counterclockwise as indicated in FIG. 23, the transfer lock shaft actuator 150 contacts the transfer eject actuator lever 296 and is rocked slightly to rotate the shaft 148. This rotation opens the clamping devices 136 through the transfer lock pivot arms 146, as shown in FIG. 20. Thus as the last copy is being produced the clamping devices 136 are opened to positively position the transfer sheet T for ejectment along with the copy sheet P, as shown in FIG. 20. The clamping devices 136 are opened to a sufficient degree such that the upper portions 141 thereof extend outside the periphery of the drum 22 thereby pushing the leading edge of the extensions 128 of the transfer sheet T a sufficient distance for positive engagement of the lower stripper 54 which will project thereunder. The leading edge of the copy sheet P will be raised by the outward movement of the surface 111 and is removed along with the transfer sheet T.

Figure 24:
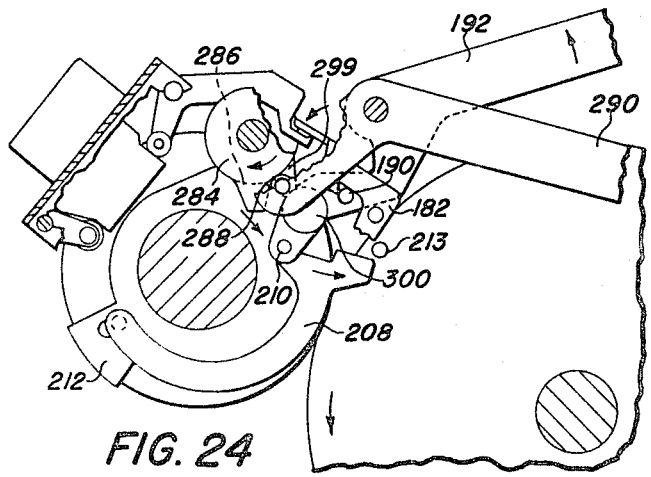

As the last copy is being made, the transfer eject cam 284 is moved out of interfering relation with the roller 288 on the link 290 thereby releasing the lever 296 to assume its original position as shown in FIG. 9. At the same time, the transfer insert cam 286 is being rotated into position as shown in FIG. 24, the lobe 29 on the transfer insert cam 300 contacts the roller 298 on the transfer cam lock link 192. This moves the transfer cam lock link 192 into the position as shown in FIG. 24. In addition, the shutter link 208 is moved into interfering relation with the pin 213. As the drum 22 rotates and the pin 213 contacts the shutter link 208, the pin slides and swings the same to the left as viewed in FIG. 24. This actuates the paper guide shutter actuator 212 which closes the shutter 50, as indicated in FIG. 17. As the lobe 299 on the transfer insert cam 286 contacts the roller 300, the transfer cam lock link 192 is rotated in a counterclockwise direction to the position as indicated in FIG. 24 which is the stop position of the machine, as shown in FIG. 9. As the transfer cam lock link 192 is moved into the position shown in FIGS. 9 and 24, the gripper lever lock 182 engages the transfer cam lock link pin 190 thereby holding the transfer cam lock link 192 in the position as shown in FIG. 24.

As indicated above, as the drum 22 starts its last rotation, the transfer lock shaft actuator 150 contacts the transfer eject actuator lever 296 which as previously stated was moved into intercepting position during the next to the last rotation of drum to open the clamping devices 136 and conditions the transfer sheet and copy sheet forward from the machine. During rotation of the drum, the copy sheet and transfer sheet are removed from the machine by means of the stripper 54. As the drum completes the segment of its movement in the last revolution the transfer lock shaft actuator 150 will engage the transfer insert actuator lever 196 which was moved in intercepting relation therewith when the cam 286 actuated the roller 300 on the link 192. This actuates the clamping devices 136 to an open position as shown in FIG. 17 ready to accept another transfer sheet and original for the next reproduction operation. Thus as the drum makes its last cycle, the transfer lock shaft actuator 150 is opened by the transfer eject lever 296 to eject transfer sheet, and the last copy sheet, is then closed as it passes the transfer eject actuator lever 296 and then is opened during the latter segment of rotation of the drum by the transfer insert actuator lever 196 ready to accept a new transfer sheet and original.

In addition, during the latter segment of the last revolution of the drum 22, the pin 213 also closes the shutter 50 by contacting the shutter link 208 and at the same time opens the interlock switch 2 LS. As the drum comes to final rest, the cam follower 306 is tripped to actuate the switch 1 LS to an open condition for terminating the energization of the motor and permitting braking of the motor by the brake. Thus the machine is brought back to its normal off position. As the last copy is made and the number wheel returns to the "0" position, the circuit to the ready light switch 3 LS opens as the lever falls within the depression 260 formed within the number wheel.

While the invention has been described with reference to the structure disclosed herein, it is not confined to the details set forth; but is intended to cover such modifications, or changes as may come within the scope of the following claims.

What is claimed is:

1. In a reproduction machine of the pressure-transfer type wherein ink is transferred from a transfer sheet to a copy sheet upon the application of pressure, the combination a rotatable drum, a roller arranged in peripheral contact with the drum and having its axis substantially in parallel with the axis of the drum, paper gripping means mounted on the drum along a line substantially parallel to the axis thereof, means for actuating said gripping means into clamping condition for holding the transfer sheet upon the drum during rotation thereof, means for opening said gripping means to an open condition to allow insertion of the leading edge of the transfer sheet, means for rotatably supporting said drum and said roller, a drive system associated with said drum for rotating the same and producing movement of sheet material between the same and the roller, pressure producing means associated with said drum and said roller and adapted to exert pressure of one upon the other along said peripheral contact during rotation of the same, sheet guide means movable to and retractable from a position adjacent the nip of the drum and the roller for directing the transfer sheet thereto; said sheet guide means extending beyond the line defined by the paper gripping means and across said line of the paper gripping means when the drum is in a position for receiving the transfer sheet to positively position the transfer sheet, a control means operatively associated with the guide means, said control means actuable for effecting movement of the guide means to and from the position adjacent the nip, said control mechanism also associated with said drive system for controlling rotation of the drum and the roller and effecting the transfer of ink from one sheet material to another by means of the pressure between the drum and the roller.

2. In a reproduction machine of the pressure-transfer type wherein ink is transferred from a transfer sheet to a copy sheet upon the application of pressure, the combination of a rotatable drum, a roller arranged in peripheral contact with the drum and having its axis substantially in parallel with the axis of the drum, paper gripping means mounted on the drum along a line substantially parallel to the axis thereof, means for actuating said gripping means into clamping condition for holding the transfer sheet upon the drum during rotation thereof, means for opening said gripping means to an open condition to allow insertion of the leading edge of the transfer sheet, means for rotatably supporting said drum, means for rotatably supporting said roller, a drive system associated with said drum for rotating the same and producing movement of sheet material between the same and the roller, pressure producing means associated with said drum and said roller and adapted to exert pressure of one upon the other along said peripheral contact during rotation of the same, sheet guide means movable to and retractable from a position adjacent the nip of the drum and the roller for directing the transfer sheet thereto;

a control mechanism operatively associated with the guide means and gripping means, said control mechanism actuable for effecting actuation of the grippers into clamping condition and at the same time effecting the retraction of the guide means from the nip of the drum and the roller and for effecting actuation of the gripping means to the open condition and at the same time effecting movement of the guide means to the nip of the roller and drum, said control mechanism also associated with said drive system for controlling rotation of the drum and the roller and effecting the transfer of ink from one sheet material to another by means of the pressure between the drum and the roller.

3. In a reproduction machine of the pressure-transfer type wherein ink is transferred from a transfer sheet to a copy sheet upon the application of pressure, the combination of a rotatable drum, a roller arranged in peripheral contact with the drum and having its axis substantially in parallel with the axis of the drum, paper gripping means mounted on the drum along a line substantially parallel to the axis thereof, means for actuating said gripping means into clamping condition for holding the transfer sheet upon the drum during rotation thereof, means for opening said gripping means to an open condition to allow insertion of the leading edge of the transfer sheet, means for rotatably supporting said drum, and means for rotatably supporting said roller, a drive system associated with said drum for rotating the same and producing movement of sheet material between the same and the roller, pressure producing means associated with said drum and said roller and adapted to exert pressure of one upon the other along said peripheral contact during rotation of the same, sheet guide means movable to and retractable from a position adjacent the nip of the drum and the roller for directing the transfer sheet thereto;

a control mechanism operatively associated with the guide means and gripping means, said control mechanism actuable for effecting actuation of the grippers into clamping condition and at the same time effecting the retraction of the guide means from the nip of the drum and the roller, and for effecting actuation of the gripping means to an open condition and at the same time effecting movement of the guide means to said nip, said control mechanism also associated with said drive system for controlling rotation of the drum and the roller and effecting the transfer of ink from one sheet material to another by means of the pressure between the drum and the roller.

References Cited

UNITED STATES PATENTS 2,315,175    3/1943    Williams _____ 101—132

ROBERT E. PULFREY, *Primary Examiner.*

E. S. BURR, *Examiner.*

H. P. EWELL, *Assistant Examiner.*